INVENTORS T. L. DOKTOR
G. PARKER
L. A. WEBER
H. M. ZYDNEY
BY R C Lipton
ATTORNEY

TELETYPEWRITER SUBSCRIBER SET

INVENTORS T. L. DOKTOR
G. PARKER
L. A. WEBER
H. M. ZYDNEY

BY R. C. Lipton

ATTORNEY

Dec. 3, 1963 T. L. DOKTOR ETAL 3,113,176

TELETYPEWRITER SUBSCRIBER SET

Filed Sept. 29, 1961 5 Sheets-Sheet 3

INVENTORS T. L. DOKTOR
G. PARKER
L. A. WEBER
H. M. ZYDNEY

BY R C Lipton

ATTORNEY

INVENTORS T. L. DOKTOR
G. PARKER
L. A. WEBER
H. M. ZYDNEY

BY R C Lipton

ATTORNEY

INVENTORS T. L. DOKTOR
G. PARKER
L. A. WEBER
H. M. ZYDNEY
BY R C Lyton
ATTORNEY 3,113,176
TELETYPEWRITER SUBSCRIBER SET
Theodore L. Doktor, Flushing, and George Parker, New York, N.Y., and Laurance A. Weber, West Orange, N.J., and Herbert M. Zydney, New York, N.Y., assignors to Bell Telephone Laboratories, Incorporated, New York, N.Y., a corporation of New York
Filed Sept. 29, 1961, Ser. No. 141,672
13 Claims. (Cl. 178—3)

Figures 1, 5:
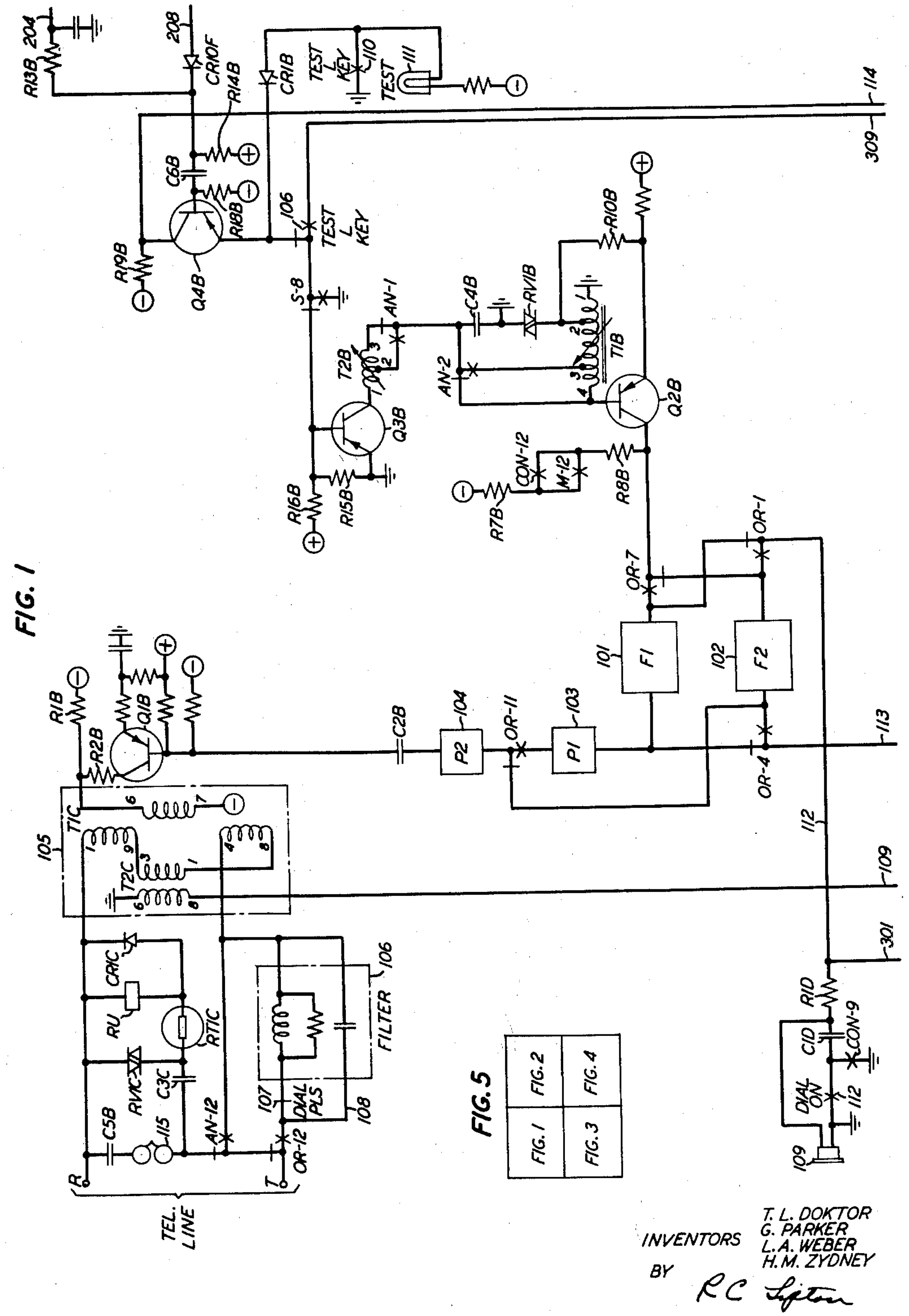

This invention relates to semi-automatic data transmission sets and, more particularly, to teletypewriter stations which are arranged to communicate by voice frequency signals over a telephone switching network.

A broad object of this invention is to provide an improved control circuit for data transmission sets.

Another object of this invention is to extend a conventional telephone subscriber line to a teletypewriter station.

A further object of this invention is to provide the interchange of supervisory signals and communication signals between teletypewriter stations by way of a telephone switching network.

In well known telephone switching practices, a telephone subscriber initiates a call by removing the telephone handset and then dialing the appropriate digits designating the desired remote subscriber when the switching office returns dial tone. With the calling subscriber monitoring the progress of the connection with the handset, the switching network extends the call to the called subscriber line and rings the called subscriber if the line is not busy. The called subscriber then completes the connection by removing the handset whereupon the subscribers may communicate through the telephone switching network. At the conclusion of the call a subscriber returns the handset to the cradle and the two stations are disconnected.

According to the present invention a subscriber data transmission set, arranged to communicate by voice frequency signals, is connected to a subscriber line extending from a conventional telephone switching office. The subscriber set is provided with a dial, a listen-only handset and a ringer whereby a call may be processed through the telephone switching network to a remote subscriber data set. When the called subscriber completes the connection, supervisory connect signals are automatically interchanged to enable the data sets to communicate through the telephone switching network. The call is then concluded by either station sending a disconnect signal which restores the remote data set to the initial condition and disconnects the station.

An additional object of this invention is to activate a data transmission set when a remote data set signals that a connection is complete.

Another object of this invention is to complete a connection to a telephone subscriber line in response to ringing signals received therefrom.

Another object of this invention is to monitor for a connect signal during the calling interval and for a disconnect signal during the conversation interval.

Another object of this invention is to provide means for communicating between teletypewriter stations by voice frequency signals.

Another object of this invention is to communicate in a separate frequency band in each direction.

Another object of this invention is to deactivate a teletypewriter when the remote station disconnects.

A further object of this invention is to disconnect a teletypewriter station at the conclusion of a call.

It is a feature of this invention that supervisory and data signals be converted to frequency shift signals in a first voice frequency band when originating a call and in a second voice frequency band when answering a call.

It is another feature to detect frequency shift signals in the first frequency band when the station answers a call and in the second frequency band when the station originates a call.

It is another feature of this invention that a teletypewriter be connected to a telephone subscriber line in response to a conventional telephone ringing signal supplied over the line and that the remote calling teletypewriter subscriber be automatically signalled that a connection has been established.

It is still a further feature of this invention to time teletypewriter marking signals prior to the completion of the connection and time the teletypewriter spacing signals during the communication interval by a common timer.

It is a further feature to send a disconnect signal and restore the subscriber line to the on-hook condition when the subscriber terminates the call.

It is an additional feature to disable a teletypewriter and disconnect the station from the subscriber line when a disconnect signal is received.

Figure 6:
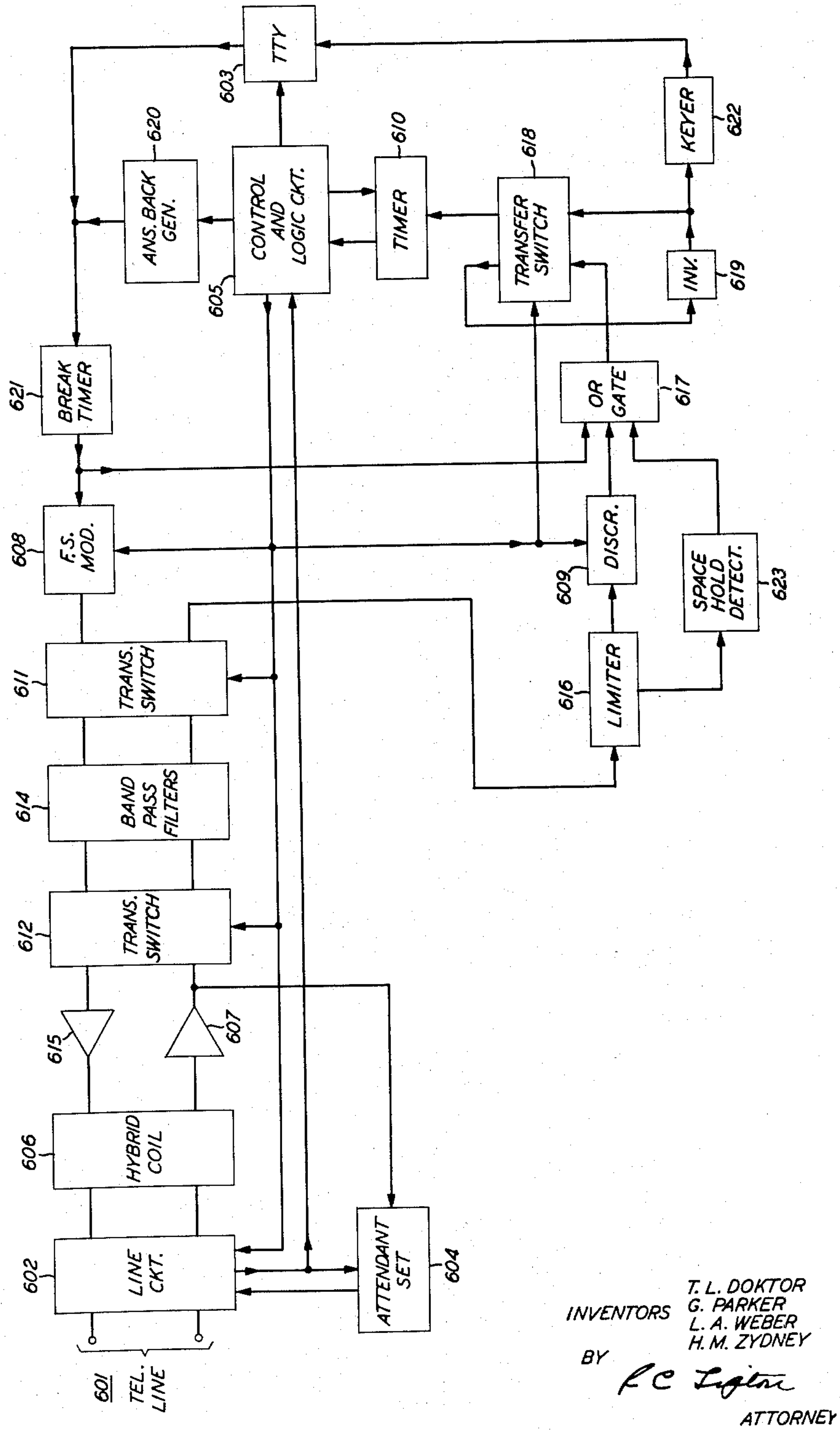

The means for fulfilling the foregoing objects and the practical embodiment of the features of this invention will be fully understood from the following description taken in conjunction with the accompanying drawing wherein:

FIGS. 1 to 4, when arranged as shown in FIG. 5, show the details of circuits and equipment which cooperate to form a teletypewriter subscriber station in accordance with this invention; and FIG. 6 illustrates in block form the various equipment and circuits of the station and the manner in which they cooperate.

In several figures of the drawing, the relay contacts are shown detached from the relay winding. Contacts which are closed when the associated relay is de-energized, known as "break contacts," are represented by a single short line perpendicular to the conductor line, while contacts which are closed when the relay is energized, known as "make contacts," are represented by two short cross lines diagonally intersecting the conductive line. Each set of relay contacts is identified by the relay core designation together with an individual contact number.

*General Description*

Referring now to FIG. 6, telephone line 601 is shown extending from line circuit 602 of the data set to a conventional telephone switching office, not shown. Telephone line 601 is a conventional line for the transmission of voice frequency signals and terminates in the remote telephone switching office in the same manner as a telephone subscriber line. Included in the data set is teletypewriter 603 which includes keyboard transmitting apparatus and printing telegraph apparatus. Typical arrangements disclosing transmitting and printing apparatus suitable for use in this system are shown, for example, in Patents 2,607,848 granted to W. J. Zenner on August 19, 1952, and 2,505,729 granted to W. J. Zenner on April 25, 1950, respectively.

The data set is provided with attendant set 604. Attendant set 604 includes a conventional telephone dial, a bell ringer, and a listen-only hand set. Additional apparatus is provided in control and logic circuit 605. This apparatus includes a first manually operated key, identified as originating key for placing the data set in condition to initiate a call, hereinafter referred to as the originating mode, a second manually operated key, identified as an answering key, for placing the data set in condition to receive a call, hereinafter referred to as the terminating mode, and a third manually operated key, identified as a clear key, for restoring the data set to the normal on-hook condition.

Each station has a frequency shift modulator generally indicated by block 608, and a frequency shift discriminator generally indicated by block 609. Each modulator and each discriminator is able to switch to either of two frequency bands, the particular band selected depending upon whether the station is in an originating mode or a terminating mode. The lower frequency band, hereinafter described as the $F_1$ band, includes frequencies corresponding to the mark and space signals which frequencies are hereinafter designated marking frequency $F_{1M}$ and spacing frequency $F_{1S}$. The upper frequency band denoted as the $F_2$ band includes frequencies corresponding to mark and spacing signals, hereinafter described as marking frequency $F_{2M}$ and spacing frequency $F_{2S}$. During data transmission, the originating station transmits signals in the $F_1$ band and receives signals in the $F_2$ band, and, conversely, the terminating station transmits signals in the $F_2$ band and receives signals in the $F_1$ band.

Assuming that a station attendant desires to call a remote station, the attendant operates the originating key. In response to the operation of the originating key, control and logic circuit 605 instructs transfer switch 611, and transfer switch 612, to extend the output of frequency shift modulator 608 to telephone line 601 by way of an appropriate bandpass filter of filters 614 arranged to pass signals in the $F_1$ band, amplifier 615, hybrid coil 606 and line circuit 602. Transfer switches 611 and 612 are also instructed to extend telephone line 601 through line circuit 602, hybrid coil 606, amplifier 607 and the appropriate filter in bandpass filters 614 to pass signals in the $F_2$ band to the input of limiter 616. Control and logic circuit 605 also conditions timer 610 to look for a continuous marking signal from discriminator 609 as described hereinafter. In addition, control and logic circuit 605 instructs line circuit 602 to complete a D.-C. path between the terminals of telephone line 601, thereby presenting an off-hook signal to the central office.

The switching equipment in the central office will return dial tone in the same manner as a normal telephone call. This dial tone is applied by way of hybrid coil 606 and amplifier 607 to the listen-only hand set in attendant set 604. When the attendant hears the dial tone she will dial the number of the desired remote station causing dialing pulses to be applied to telephone line 601 by way of line circuit 602. The telephone switching office, in response to the dialed digits, performs the conventional switching action to extend the line to the called station in the same manner as an ordinary telephone call. Originating attendant may monitor the progress of the call by listening to the audible tones with the listen-only hand set.

When the call is completed to the called station the telephone office provides ringing tone to telephone line 601 of the called station. This ringing tone is applied to the ringer in attendant set 604.

In the event that the called station is arranged for unattended operation, line circuit 602 responds to the ringing signal by informing control and logic circuit 605 that a call is being received. If the called station is arranged for attended operation, the attendant will operate the answer key when the station is rung, thereby informing control and logic circuit 605 that the station is being called. In either event, control and logic circuit 605 instructs line circuit 602 to provide an off-hook signal to the terminating central office.

When control and logic circuit 605 of the terminating station is advised that a call has been received, circuit 605 instructs timer 610 to time an interval of approximately one second. During this interval the terminating station is maintained in a quiescent condition to guarantee the propagation of the off-hook signal from the terminating central office to the originating central office.

At the conclusion of the one second interval, timer 610 times out and control and logic circuit 605, in response thereto, arranges discriminator 609 to receive signals in the $F_1$ band and activates frequency shift modulator 608 to send marking frequency $F_{2M}$. Frequency shift modulator 608, in response thereto, transmits marking frequency $F_{2M}$ by way of transfer switch 611, bandpass filter 614, which filters are normally arranged to pass frequency $F_{2M}$, transfer switch 612, amplifier 615, hybrid coil 606 and line circuit 602 to telephone line 601. In addition, control and logic circuit 605 instructs timer 610 to look for a continuous marking signal applied thereto by discriminator 609, as described hereinafter.

At the originating station, marking frequency $F_{2M}$ is received from line 601 and applied by way of bandpass filter 614 to limiter 616, as previously described. Limiter 616 limits the frequency shift wave and a limited wave is applied to discriminator 609 which is normally arranged to respond to signals in the $F_1$ band. Accordingly, discriminator 609 applies a marking signal to OR gate 617, and OR gate 617, in turn, applies the marking signal to the input of timer 610 by way of transfer switch 618.

When a marking signal is received by the originating station for a one second interval, timer 610 times out and control and logic circuit 605, in response thereto, starts up the motor of teletypewriter 603. In addition, control and logic circuit 605 activates frequency shift modulator 608 and frequency shift modulator 608, at the originating station, applies marking frequency $F_{1M}$ to telephone line 601. Furthermore, control and logic circuit 605 instructs transfer switch 618 to transfer the output of OR gate 617 from timer 610 to the input of inverter 619 and extend an output of inverter 619 to the input of timer 610. Timer 610 is, at this time, recycled by control and logic circuit 605. Since the output of discriminator 609 is now applied to the input of timer 610 by way of inverter 619, the conditions of the marking and spacing signals are inverted, and timer 610 is thus arranged to look for a continuous spacing signal.

At the terminating station, marking frequency $F_{1M}$ is received across the telephone line 601 and applied by way of limiter 616 to discriminator 609. Discriminator 609, in turn, applies the marking signal to timer 610 by way of OR gate 617 and transfer switch 618. When the marking signal has been received for an interval of approximately one second, timer 610 times out and control and logic circuit 605, in response thereto, turns on the motor of teletypewriter 603. In addition, control and logic circuit 605 instructs transfer switch 618 to transfer the output of OR gate 617 from timer 610 to the input of inverter 619, and extend an output of inverter 619 to the input of timer 610. Timer 610 is, at this time, recycled and thus arranged to look for a continuous spacing signal in the same manner as the corresponding timer at the originating station.

In the event that the terminating station is arranged for unattended operation, answer-back generator 620 is provided. Control and logic circuit 605, at the termination of the marking interval, energizes generator 620, thereby providing the application of an answer-back signal to frequency shift modulator 608 by way of break timer 621. If the terminating station is arranged for attended operation, the attendant thereat operates the keyboard of teletypewriter 603, whereby an answer-back signal is applied to frequency shift modulator 608 by way of break timer 621.

The stations are now in condition for communication. Signals transmitted from teletypewriter 603 are applied to frequency shift modulator 608 by way of break timer 621. Frequency shift modulator 608, in response to the marking or spacing signals applied thereto, converts the signals to frequency shift signals in the appropriate frequency band and applies the signals to the telephone line. Frequency shift signals received from the remote station by way of telephone line 601 are applied to the input of discriminator 609 by way of limiter 616. Discriminator 609, in response to the frequency shift signals applied thereto, converts the signals to the conventional telegraph mark and space signals and applies the signals by way of OR gate 617, transfer switch 618, inverter 619 and keyer 622 to the input of the printing apparatus of teletypewriter 603. It is noted that during the communication interval, timer 610 at each of the stations is looking for a continuous spacing signal as previously described.

Break timer 621 functions to repeat telegraph signals applied thereto to frequency shift modulator 608. In addition, break timer 621 is arranged to limit the duration of spacing signals to a predetermined interval. This is required in the present arrangement because a spacing signal longer than this interval functions to initiate the disconnection of the station from the telephone line.

The output of break timer 621 is also provided to an input or OR gate 617. Accordingly, signals transmitted from the keyboard of teletypewriter 603 are passed through break timer 621, OR gate 617, transfer switch 618, inverter 619 and keyer 622 to the select magnet of the printing apparatus in teletypewriter 603. This provides a local copy of the communication transmitted to the remote station.

When the call is completed, the attendant at one of the stations operates the clear key in the control and logic circuit. Operation of the clear key arranges control and logic circuit 605 to instruct frequency shift modulator 608 to send a continuous spacing signal in the appropriate frequency band. Control and logic circuit 605 also turns off the motor of teletypewriter 603 and recycles timer 610 to time a one second interval.

At the conclusion of the one second interval, timer 610 times out and control and logic circuit 605 responds thereto by disabling frequency shift modulator 608, restoring telephone line 601 to the on-hook condition and returning transfer switch 611, transfer switch 612, transfer switch 618 and discriminator 609 to the initial quiescent condition.

At the remote station the one second spacing signal is received by timer 610. Timer 610, which is looking for the one second spacing signal, as previously described, times out and, in consequence thereof, arranges control and logic circuit 605 in the same manner corresponding to the operation of the clear key. The subsequent functions of the remote station are, therefore, identical to the previously described disconnect functions of the station initiating the disconnect sequence. The one second spacing signal transmitted by the remote station performs no function under these circumstances.

Each of the stations is provided with space-hold detector circuit 623. Space-hold detector 623 functions to observe the level of the frequency shift signals applied to limiter 616. In the event that the incoming frequency shift signal falls below a predetermined threshold level, spacehold detector 623 provides a simulated spacing signal to an input of OR gate 617. Accordingly, in the event that the signal is lost because of a transmission failure, for example, a continuous spacing signal is provided by way of OR gate 617 to timer 610 and teletypewriter 603. As a result, timer 610 times out and arranges control and logic circuit 605 in the same manner as the operation of the clear key. Thus, transmission failure automatically disconnects the two stations.

*Break Timer*

Figure 2:
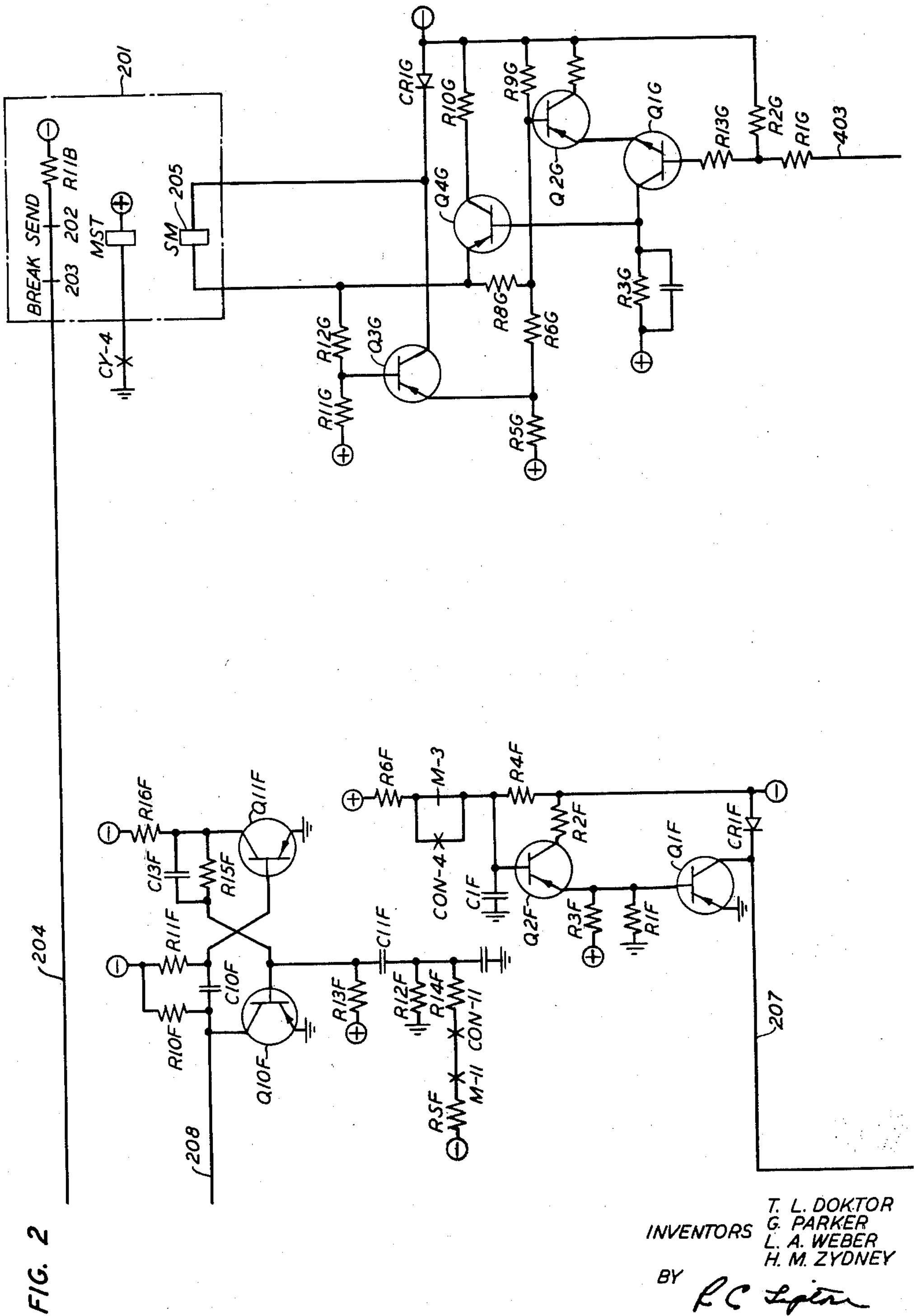

Assuming a connection has been set up as previously described in general terms and the teletypewriter keyboard of the teletypewriter, generally indicated by block 201, FIG. 2, is not active whereby data is not being transmitted, the teletypewriter send contacts 202 and break contacts 203 are closed designating a marking condition. This completes a circuit from negative battery through resistor R11B, send contacts 202, break contacts 203, lead 204, resistor R13B, FIG. 1, and resistor R14B to positive battery applying the negative potential at the junction of resistors R13B and R14B to the right-hand plate of capacitor C6B, as shown in FIG. 1. The other plate of capacitor C6B is connected to the base of transistor Q4B and when send contacts 202 are maintained in the closed marking condition, transistor Q4B conducts due to negative battery applied to its base by way of resistor R18B. Therefore, negative battery is normally applied through resistor R19B, the collector-to-emitter path of transistor Q4B, the break contacts of test key contacts 106, and the break contacts of relay contacts S–8 to the base of transistor Q3B.

Assuming now that send contacts 202 open to send a spacing signal, the negative battery applied by way of send contacts 202 and break contacts 203 is removed from capacitor C6B and positive battery is applied thereto by way of resistor R14B. This results in a positive-going voltage spike transmitted through capacitor C6B to the base of transistor Q4B cutting off the transistor. When send contacts 202 reclose to send a marking signal, the negative battery is reapplied to capacitor C6B and the resultant negative-going voltage spike transmitted through capacitor C6B turns transistor Q4B back On.

Transistor Q4B constitutes a break timer which responds to a prolonged spacing signal by turning Off for a predetermined maximum interval of time. If, during a conversation, the receiving station wishes to interrupt transmission, a spacing "break" signal may be transmitted to interrupt the transmitting station. It is desirable, however, that this spacing "break" signal is long enough to be detected at the transmitting station, but sufficiently short not to be misinterpreted as a disconnect signal. Transistor Q4B is arranged to turn back On when break contacts 203 are open for a prolonged interval because capacitor C6B discharges by way of resistor R18B to negative battery to reapply negative voltage to the base of transistor Q4B. Accordingly, when a break signal is transmitted by opening break contacts 203, the positive-going voltage spike through capacitor C6B cuts off transistor Q4B, as previously described, but transistor Q4B turns back On after a maximum predetermined duration of time as determined by the discharge time of capacitor C6B whereby no spaces may be transmitted which are longer than the maximum interval.

*Modulator*

Transistor Q3B is the transistor which governs the frequency-shift of the data channel. In the quiescent condition, with the teletypewriter marking and transistor Q4B conducting, the negative voltage applied to the base of transistor Q3B renders it conductive. When transistor Q3B conducts, and the data set is in the originating mode whereby relay AN is released, as described hereinafter, a conductive path is connected from ground by way of the emitter-to-collector path of transistor Q3B, terminals 1 through 3 of inductor T2B, the break contacts of relay contacts AN–1 and the break contacts of contacts AN–2 to terminal 4 of inductor T1B. Since terminal 1 of inductor T1B is connected to ground, inductor T2B is thus placed in parallel with inductor T1B.

When the data set is in the answer mode of operation the AN relay will be operated and a conducting path from ground is connected by way of the emitter-to-collector path of transistor Q3B and then from terminal 1 to the tap on terminal 2 of inductor T2B, and make contacts of contacts AN–1 and the make contacts of contacts AN–2 to the tap on terminal 3 of inductor T1B, placing the portion of inductor T2B between terminals 1 and 2 in parallel with the portion of inductor T1B between terminals 3 and 1.

When transistor Q4B stops conducting, the negative collector voltage of transistor Q4B which normally maintains transistor Q3B On is removed. Transistor Q3B turns Off because of the back bias provided by positive battery to the base of transistor Q3B by way of resistor R16B, opening the emitter-to-collector path to terminal 1 of inductor T2B. Accordingly, inductor T2B no longer shunts the tank inductor T1B.

Thus, keyer transistor Q3B either places inductor T2B in shunt with tank inductor T1B or removes inductor T2B depending upon whether send contacts 202 or break contacts 203 are closed or open corresponding, respectively, to the mark or space condition to be transmitted.

Transistor stage Q2B, FIG. 1, constitutes the oscillator. Its tank circuit consists of inductor T1B and capacitor C4B which is connected between ground and terminal 4 of inductor T1B when relay AN is released or terminal 3 of inductor T1B when relay AN is operated. The basic frequency of this oscillator, when relay AN is released, is controlled to oscillate in the lower or $F_1$ band. If relay AN is operating the amount of inductance across capacitor C4B is reduced, as previously described, resulting in a basic frequency in the higher or $F_2$ band. In addition, when send contacts 202 are closed, corresponding to a marking signal, transistor Q3B is conducting and the oscillator tank circuit is shunted by inductor T2B, as previously described, reducing the inductance across the tank circuit and causing the oscillator to oscillate at a higher frequency in the basic frequency band. This corresponds to the frequency $F_{1M}$ or $F_{2M}$, which is chosen to represent the marking condition. Conversely, when send contacts 202 are open, corresponding to a spacing signal, shunting inductor T2B is removed from the tank circuit, as previously described, whereby the frequency is decreased in the basic frequency band. This corresponds to the spacing frequency $F_{1S}$ or $F_{2S}$.

The collector of transistor Q2B is connected to negative battery by way of resistor R8B, make contacts M–12 or CON–12 in parallel, and resistor R7B. Relays M and CON are closed at appropriate times in the control sequence to start the oscillator as described hereinafter. The feedback path for the oscillator consists of resistor R10B. Varistor RV1B across terminals 2 and 1 of inductor T1B, which varistor may suitably comprise two reversibly poled diodes in parallel, stabilizes the amplitude of the oscillator so that linear operation may be obtained.

The output of the oscillator is taken from the collector of transistor Q2B and proceeds through an appropriate filter to the amplifier transistor Q1B. Two filters are provided comprising a bandpass filter for the $F_1$ band, generally indicated by block 101, and a bandpass filter for the $F_2$ band, generally indicated by block 102. When the data set is in the originating mode, relay OR is operated and relay AN is released, as described hereinafter, the oscillator is tuned to the $F_1$ band, the $F_1$ filter 101 is put in the transmitting branch, the $F_2$ filter 102 is in the receiving branch. The output of the oscillator in this case is connected from the collector of transistor Q2B through the make contacts of contacts OR–7, $F_1$ filter 101, send level adjustment pad 103, make contacts of contacts OR–11, send level adustment pad 104, and capacitor C2B to the base of transistor Q1B.

Conversely, when the data set is in the terminating mode, relay AN is operated and relay OR is released, the oscillator is tuned to the $F_2$ band, $F_2$ filter 102 is introduced in the transmitting branch, and $F_1$ filter 101 is in the receiving branch. The output of the oscillator in this case is connected from the collector of transistor Q2B through the break contacts of contacts OR–7, $F_2$ filter 102, the break contacts of contacts OR–11, pad 104, and capacitor C2B to the base of transistor Q1B.

As described above, the appropriate filter and level adjustment pads for each mode of operation are inserted in the transmitting branch. Level adjustment pads provide adjustment of the send level as is well known in the art. It will be recalled that the $F_2$ band has a higher frequency than the $F_1$ band. It may, therefore, be desirable to transmit the $F_2$ band at a higher level than the $F_1$ band. This result is obtained by placing pads 103 and 104 in the series with the transmitting branch when transmitting in the $F_1$ band.

Transistor Q1B is a power stage which provides sufficient signal power to drive the telephone line and isolates the line from the bandpass filters. Transistor Q1B is a standard common emitter voltage amplifier with its collector output taken between resistor R1B and resistor R2B and fed to the hybrid, generally indicated by block 105.

Hybrid coil 105, which is partially shown in FIG. 1, includes hybrid coil T2C and hybrid coil T1C. The output of amplifier transistor Q1B is placed across terminals 6 and 7 of hybrid coil T1C. As is well known in the art, the resultant signal is applied across terminals 1 and 4 of hybrid coil T1C and isolated from hybrid coil T2C. Terminal 1 of transformer T1C is connected to the ring terminal of the telephone line and terminal 4 of transformer T1C is connected to the tip of the telephone line by way of the make contacts of contacts AN–12 and the break contacts of contacts OR–12 when the data set is in the terminating mode, or by way of filter 106, lead 108 and dial pulse contacts 107 in parallel, and the make contacts of contacts OR–12 when the data set is in the originating mode. Thus, the output across terminals 4 and 1 of transformer T1C is applied across the tip and ring terminals of the telephone line.

*Limiter*

As previously described, the tip and ring terminals of the telephone line are connected to terminals 4 and 1, respectively, of transformer T1C. Accordingly, signals entering from the telephone line are applied across transformer T1C of hybrid 105. As is well known in the art, these signals are applied across terminals 6 and 8 of transformer T2C and isolated from the T1C coil across terminals 6 and 7. The output of transformer T2C is applied to the base of transistor stage Q1D, FIG. 3, of the limiter by way of lead 109 and resistor R5D.

Transistor Q1D is a buffer amplifier to isolate the line from the receiving bandpass filter and to provide a means for adjusting the gain of the limiter. The input impedance of transistor Q1D is adjusted to match the receiving branch impedance of the hybrid coil by choosing appropriate values for resistors R4D, R5D and R6D. Potentiometer R3D in the emitter circuit provides a gain adjustment. The listen-only hand set 109, FIG. 1, is connected in series with the collector ground supply of transistor Q1D via lead 301 and resistor R1D to permit audible monitoring of supervisory signals such as busy back tones and audible ringing when the call is being set up. After the call has been set up, the use of a hand set is no longer required and the closure of relay contact CON–9 at that time short-circuits the hand set through capacitor C1D. The off-normal dial contact 112 also short-circuits the hand set to prevent dial pulses from disturbing the listener while dialing.

The output of the collector of transistor Q1D is connected through lead 301 and lead 112 to the OR relay switching arrangement so that the appropriate filter is switched into the receiving circuit. If the station is in the originating mode, relay OR is operated and the discriminator is tuned to the $F_2$ band as described hereinafter. Thus, with relay OR operated, the output signals from transistor Q1D are applied via leads 301 and 112, the make contacts of contacts OR–1, $F_2$ filter 102, the make contacts of contacts OR–4, lead 113, capacitor C3D, FIG. 3, and resistor R9D to the base of transistor Q2D. If the station is a terminating station, relay OR is released, the discriminator is tuned to the $F_1$ band, and the output signals from transistor Q1D are applied by way of the break contacts of contacts OR–1, $F_1$ filter 101, the break contacts of contacts OR–4, lead 113, capacitor C3D, and resistor R9D to the base of transistor Q2D.

Transistor Q2D, which comprises the first limiting stage, limits by virtue of the A.-C. feedback connection from the collector to the base through capacitor C4D and varistor RV1D. The appropriate bias for the base of transistor Q2D is obtained from the junction of resistors R7D and R8D which are connected in series with resistors R12D and R14D between ground and positive battery. When the peak to peak output at the collector of transistor Q2D exceeds the threshold of varistor RV1D, the varistor conducts causing negative feedback to reduce the gain of the stage. Thus, any signal which exceeds a predetermined amplitude will be limited by the action of this feedback circuit. The output from the collector of transistor Q2D is fed through capacitor C6D and resistor R13D to the base of transistor Q3D which is the second limiter stage.

The operation and arrangement of transistor Q3D is substantially identical to that of transistor Q2D. The feedback path of transistor Q3D is shown comprising capacitor C9D and varistor RV2D, in series. It is understood, of course, that two or more varistors may be provided in series to reduce the feedback and thereby provide less limiting as determined by the desired output level.

The particular stages which limit depend upon the input signal level. For high input levels, both stages limit to some extent. For low input levels, only the final stage performs the limiting function. Accordingly, the frequency shift signal provided to the output of transistor Q3D is substantially uniform in amplitude and rectangular in form due to the limiting action of transistor stages Q2D and Q3D.

The collector output of transistor Q3D is D.-C. coupled to the base of driver transistor Q4D. The collector of transistor Q4D drives the discriminator and the emitter of transistor Q4D drives the space-hold detector circuit as described below.

Figure 3:
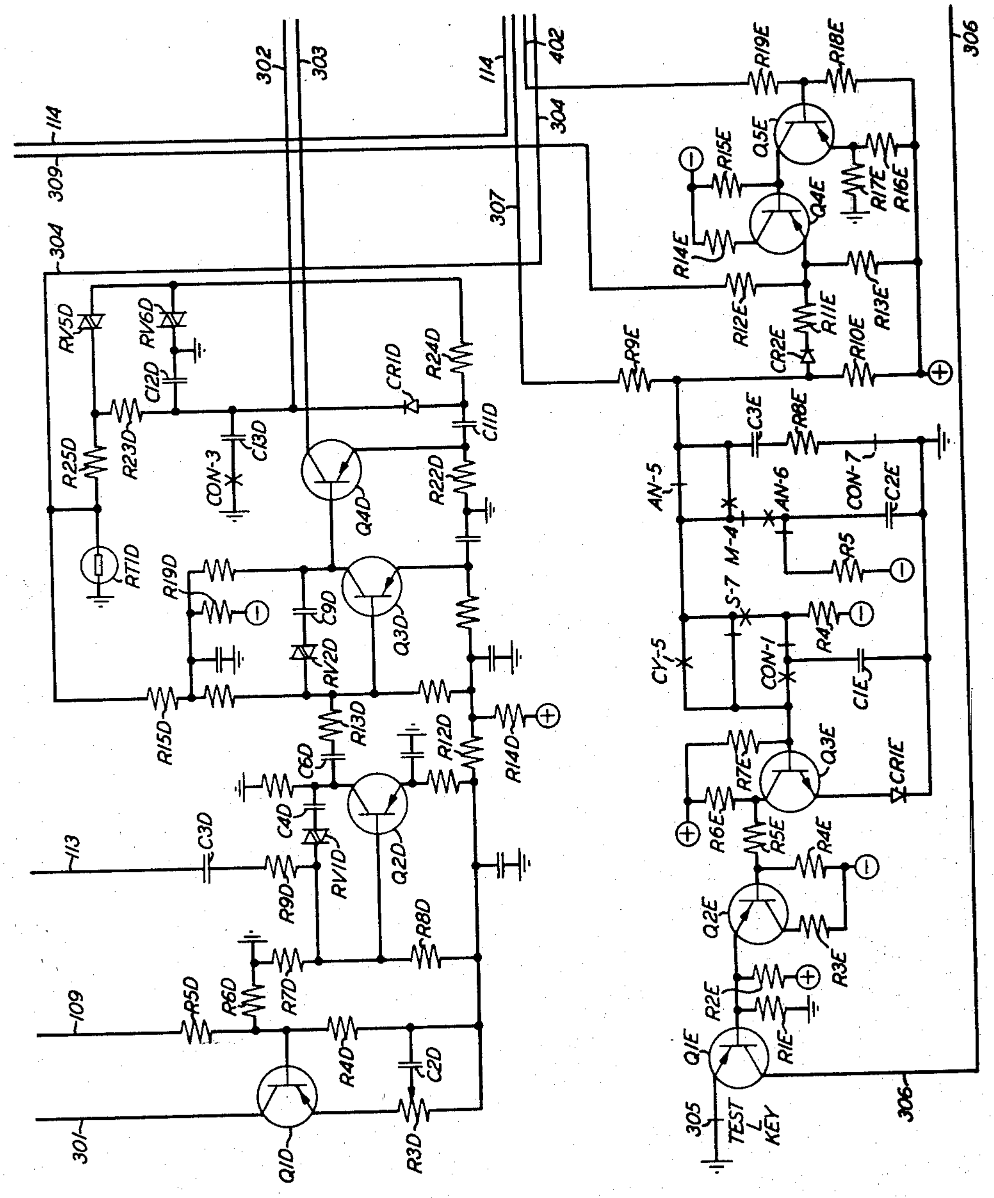

The space-hold detector consists of resistors R19D, R15D, R25D, R23D and R24D, thermistor RT1D, varistors RV5D and RV6D, diode CR1D, and capacitors C11D, C12D and C13D all shown in FIG. 3. The function of the space-hold detector is to make a judgement as to whether or not a signal is being received from the line at a level above a minimum acceptable limit. If a signal above this level is being received, the space-hold detector allows the incoming signals to pass freely through the discriminator. If the incoming level from the line is below this limit, the space-hold detector is designed to block transmission through the discriminator from the line and hold the discriminator output in the spacing condition.

Figure 4:
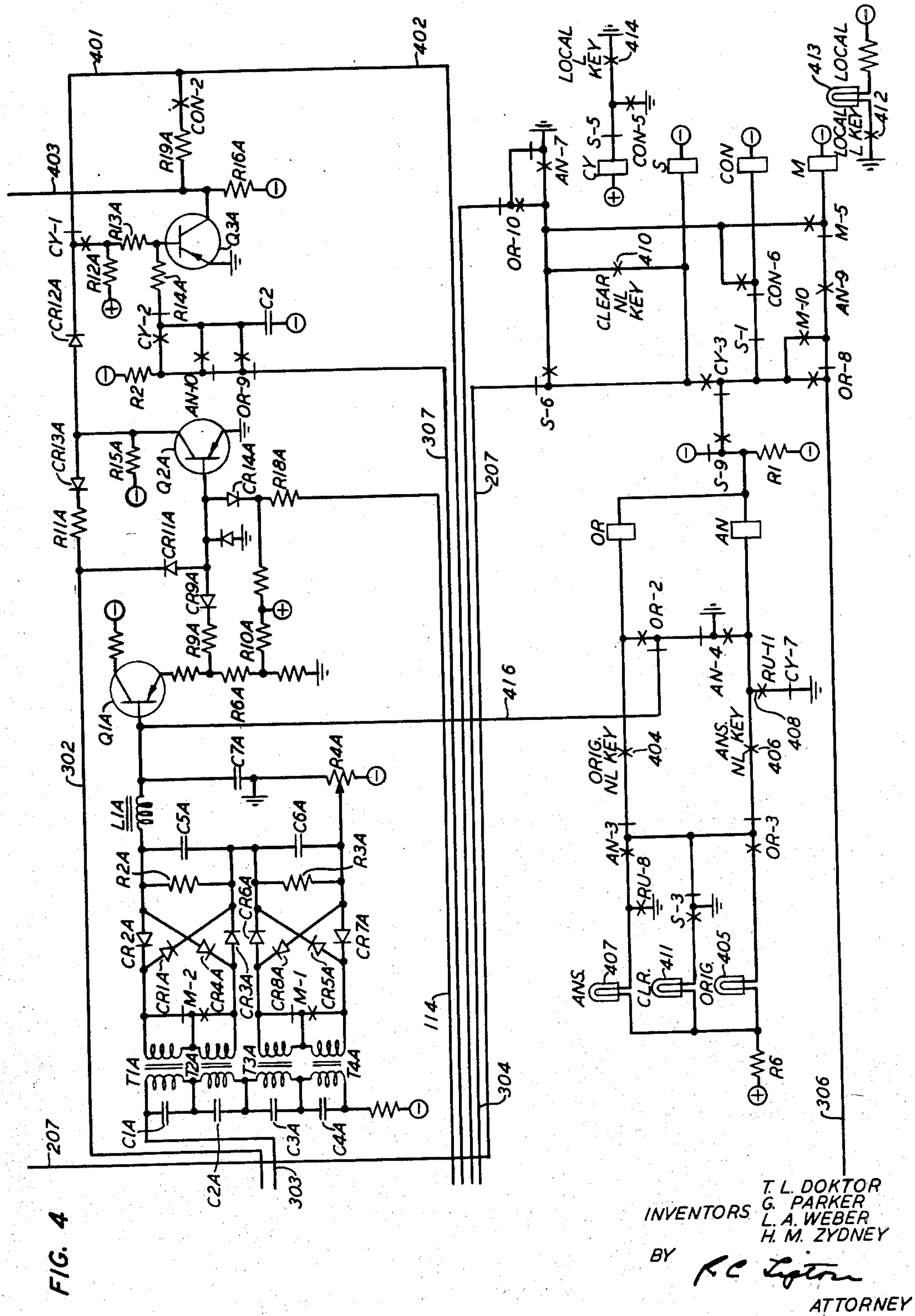

The output of the space-hold detector is obtained at the junction of diode CR1D and capacitors C12D and C13D and applied by way of lead 302 and OR gate diode CR11A, FIG. 4, to the input of transistor stage Q2A in the discriminator. In the absence of received signals, the voltage of space-hold control lead 302 is negative due to a negative bias voltage applied by way of resistors R19D, R15D, R25D and R23D. This negative voltage causes diode CR11A to conduct, thereby holding transistor Q2A in the On condition. During the reception of signals, the limited wave provided at the emitter of transistor Q4D is applied to capacitor C11D. The right-hand plate of capacitor C11D, as shown in FIG. 3, is connected to ground by way of resistor R24D and varistor RV6D. Thus, a wave having an amplitude related to the amount that the received signal wave is limited is applied to diode CR1D which is connected to the junction of capacitor C11D and resistor R24D. Diode CR1D in turn passes the positive portions of the wave to oppose the negative bias on lead 302. When the level is high enough so that the positive output voltage from diode CR1D overcomes the negative voltage on space-hold control lead 302, diode CR11A no longer conducts, isolating transistor Q2A from the space-hold detector.

The function of thermistor RT1D and varistors RV5D and RV6D, together with resistors R15D and R25D, is to cause a variation with temperature of the negative bias component of the space-hold output voltage, since the bias component is obtained from the voltage divider circuits in which these resistors and temperature sensitive elements are situated. This provides a compensation for the variation with temperature of the positive voltage which is derived by diode CR1D from part of the limiter output voltage.

In the local mode, which will be described later, it is necessary to disable the space-hold circuit. For this purpose, the negative voltage bias source is short-circuited to ground through lead 304 and the break contacts of contacts OR–10 and AN–7, FIG. 4. When the data set is switched to the originating or terminating mode, relay OR or relay AN operates and the negative voltage charge rapidly builds up on lead 302 to render the space-hold circuit effective. For this reason, the value of capacitor C12D, which is connected across lead 302 and ground, is relatively small. When the connecting sequence is completed, relay CON operates, as described hereinafter, and the capacity is increased by extending ground to capaictor C13D by way of make contacts CON–3 thereby connecting capacitor C13D in parallel with capacitor C12D to minimize the fluctuations of the space-hold voltage due to amplitude variations of the limiter output. When the received signal is low and near the operating threshold circuit, such fluctuations in the space-hold output voltage might produce an undesired amplitude modulation of the signals passing through diode CR11A to transistor stage Q2A.

*Discriminator*

The discriminator, FIG. 4, which consists of four parallel tuned circuits in series composed of inductors T1A, T2A, T3A and T4A and capacitors C1A, C2A, C3A and C4A, is driven by the collector current of transistor Q4D by way of lead 303. The secondaries of the inductors are selected in pairs by means of relay contacts M–1 and M–2 which short-circuit the undesired secondaries. With a short-circuited secondary in one of the tuned circuits, the primary circuit resonance for that circuit is shifted sufficiently high in frequency so as to have no influence on the resonance of the remaining coils.

If a station is in the terminating mode, relay M is operated as described hereinafter, and the secondaries of inductors T2A and T4A are short-circuited. The active elements of the discriminator in this case are inductor T1A and capacitor C1A in shunt thereto and inductor T3A and capacitor C3A in shunt thereto. With these tuned circuits active, the discriminator has the normal S-shaped curve rendering the discriminator effective in the $F_1$ frequency band. In addition, inductor T1A together with the capacitor C1A is tuned to excite the diode bridge consisting of diodes CR1A through CR4A in response to the space frequency and the inductor T3A together with capacitor C3A is tuned to excite the diode bridge consisting of diodes CR5A through CR8A in response to the marking frequency. If the station is in the original mode, relay M is released and the secondaries of inductors T1A and T3A are short-circuited, rendering active the tuned circuits comprising inductor T2A together with capacitor C2A and inductor T4A together with capacitor C4A. In this case, the discriminator is tuned to the $F_2$ band as is appropriate for an originating station.

The tuning of the discriminator network is such that the peaks of the resonances are slightly higher and lower than the mark and space frequencies. This produces a linear frequency-to-amplitude conversion. The amplitude output is then detected by the diode bridges and developed across load resistors R2A and R3A. Capacitors C5A and C6A are smoothing capacitors to filter out the carrier ripple. Since the diode bridges are oppositely poled, a mark frequency coming into the discriminator will develop a positive voltage across the output load and a spacing frequency will develop a negative polarity across the output load. These signals are fed through the low pass filter consisting of inductor L1A and capacitor C7A to the base of transistor amplifier stage Q1A. Provision is made to adjust the position of the discriminator S curve by means of potentiometer R4A.

Transistor Q1A is an emitter follower with load resistor R6A. The application of a negative spacing signal to the base of transistor Q1A increases the emitter-to-collector current providing a negative signal at the junction of load resistor R6A and resistor R9A. Conversely, a positive marking signal applied to the base of transistor Q1A drives the voltage at the junction of resistors R6A and R9A in a positive direction due to the application of positive battery by way of resistor R10A.

The output taken from the emitter of transistor Q1A drives the base of transistor amplifier stage Q2A through resistor R9A and OR gate diode CR9A. The space-hold clamp described above connects to the base input of transistor Q2A through another OR gate diode CR11A. The collector output of the break timer transistor stage Q4B connects to the base of transistor Q2A over lead 114, resistor R18A and through a third OR gate diode CR14A. This latter circuit causes the locally-sent signals to be repeated by transistor amplifier Q2A and subsequent stages to the teletypewriter select magnet, as described hereinafter, providing local copy.

In the quiescent condition, the teletypewriter is sending a continuous marking signal and the demodulator is receiving a marking frequency. Under this condition, assuming the received signal is at a desired amplitude whereby the space-hold detector overcomes the negative bias on lead 302, none of diodes CR9A, CR11A or CR14A is applying a negative potential to the base of transistor Q2A, whereby the transistor is in the nonconductive condition. In the nonconductive condition, negative battery is applied to the collector of transitor Q2A by way of resistor R15A. When a spacing signal is being sent by the teletypewriter or being received by the demodulator, or the received signal level is below the threshold level, a negative potential is applied to the base of transistor Q2A as previously described, and the transistor is in the conductive condition whereby the collector is substantially at ground potential.

During the application of a negative spacing signal to the base of transistor Q2A, leakage current is drawn through diode CR11A from the space-hold detector capacitors C12D and C11D via lead 302. In the event that the signal level just exceeds the permissable level, the leakage current may re-establish the negative bias on lead 302. At the termination of the spacing signal an interval is required by the space-hold detector to overcome the negative bias whereby distortion of the signals results. To compensate for the leakage current through diode CR11A, a clamp comprising diode CR13A and resistor R11A is connected between the collector of transistor Q2A and lead 302. When a spacing signal is received, the collector of transistor Q2A is at ground potential, removing the back bias on diode CR13A and providing current to diode CR11A to compensate for the leakage current.

The collector output of transistor Q2A is connected through Zener diode CR12A to relay contacts CY-1. Relay CY is unoperated prior to the connection of the teletypewriter to the output of the demodulator. With relay CY released, the output of transistor Q2A is fed through the break contacts of contacts CY-1, leads 401 and 402, and resistors R19E and R18E, FIG. 3, to positive battery controlling the signal applied to the base of timer input transistor Q5E at the junction of resistors R19E and R18E. With this connection, a positive potential is applied to the base of transistor Q5E via resistors R18E and R19E, leads 401 and 402, and Zener diode CR12A when the collector of transistor Q2A is at the spacing ground condition. When the collector of transistor Q2A goes to the marking negative condition, a negative potential is applied to the base of transistor Q5E by way of Zener diode CR12A conducting in the reverse direction and leads 401 and 402 and resistors R19E and R18E.

The timer circuit subsequently operates relays CON and CY, as described hereinafter, connecting the collector output of transistor Q2A to positive battery by way of Zener diode CR12A, the make contacts of contacts CY-1 and resistor R12A, controlling the signal applied to the base of transistor Q3A via resistor R13A. Accordingly, with this connection, a marking signal produces a negative voltage and a spacing signal produces a positive voltage at the base of transistor Q3A.

The application of marking negative voltage at the base of transistor Q3A turns it On causing current to flow from ground through the emitter-to-collector path of transistor Q3A, lead 403, and resistors R1G and R2G in the keyer circuit, FIG. 2, to negative battery. This current flowing into the keyer circuit results in current through select magnet 205 of teletypewriter 201 as described hereinafter.

Transistor Q3A is cut off when a positive spacing signal is applied to its base, driving its collector negative due to battery applied by way of resistor R16A. Since relay CON is operated, this negative voltage is fed through resistor R19A, make contacts CON-2, lead 402, and resistor R19E to timer input transistor Q5E. Prior to the operation of relays CON and CY, transistor Q2A applies negative signals corresponding to marking signals and positive signals corresponding to spacing signals to the timer. Following the operation of relays CON and CY, the timer is connected to transistor Q3A which provides a logical inversion. At this point, the application of a negative voltage by transistor stage Q3A to the timer corresponds to a spacing condition, and positive, ground voltage corresponds to a marking condition.

*Keyer*

The keyer, or electronic select magnet driver, comprising transistors Q1G through Q4G, FIG. 2, amplifies the discriminator output sufficiently to drive select magnet 205 of teletypewriter 201. The discriminator output transistor stage Q3A feeds current in response to marking signals through input resistors R1G and R2G of the keyer as previously described. Accordingly, the junction of these resistors has a negative potential determined by the negative battery applied via resistor R2G during a spacing signal and a potential relatively positive thereto during a marking signal. These voltages are fed through resistor R13G to the base of transistor Q1G.

Transistors Q1G, Q2G and Q4G form a trigger input circuit which has two stable states. This circuit triggers in one direction when the input voltage rises above some threshold value and goes back to its original state when the voltage falls below this value.

Transistors Q3G and Q4G constitute switches that control the application of current through select magnet 205 in accordance with the condition of the bistable input trigger circuit. Transistor Q4G and diode CR1G provide a controlled discharge circuit for the select magnet inductance when the input signal goes spacing and the current through select magnet 205 is removed as described below. This discharge circuit thus prevents the generation of high induced voltages across the inductance of the select magnet winding.

When the input to the keyer is spacing, all four of transistors Q1G through Q4G are in a nonconductive condition. The base of transistor Q2G is connected to the junction of resistors R9G and R6G, which resistors are connected in series with resistor R5G between negative and positive battery. Accordingly, the base of transistor Q2G is positive relative to the potential on the base of transistor Q1G during spacing signals. Since the emitter of transistor Q1G is connected to the emitter of transistor Q2G, a back bias is developed across the two emitters to base junctions in series and neither transistor conducts.

The collector of transistor Q1G is connected to positive battery by way of resistor R3G and directly connected to the base of transistor Q4G. The emitter of transistor Q4G is connected by way of resistor R8G to the junction of resistors R6G and R9G, and is connected to positive battery by way of resistors R12G and R11G. This renders the base of transistor Q4G positive relative to the potential on the emitter so that transistor Q4G is back biased and nonconducting.

The base of transistor Q3G is connected to the junction of resistors R11G and R12G, which resistors are connected in series with resistor R8G between positive battery and the junction of resistors R6G and R9G. The emitter of transistor Q3G is connected to the junction of voltage divider resistors R5G and R6G. The values of resistors R5G, R6G, R8G, R11G and R12G are arranged to provide a potential at the base of transistor Q3G relative positive to the emitter potential whereby transistor Q3G is back biased and therefore nonconducting.

When a marking signal is applied by the discriminator output to the keyer, the voltage on the base of transistor Q1G is driven in a positive direction. Since this base voltage is more positive than the base voltage of transistor Q2G, both transistor Q1G and transistor Q2G become forward biased and conduct. When transistor Q1G conducts, its collector voltage is driven in a negative direction applying negative potential to the base of transistor Q4G. The application of the negative potential to the base of transistor Q4G causes transistor Q4G to become forward biased. With transistor Q4G conductive, its emitter potential is rendered negative and this negative potential is applied by way of resistor R12G to the base of transistor Q3G. In addition, the negative emitter potential of transistor Q4G is applied by way of resistor R8G to the base of transistor Q2G to provide positive feedback by increasing the forward bias on transistors Q2G and Q1G.

The application of the negative potential to the base of transistor Q3G turns the transistor On. This results in current from positive battery by way of resistor R5G, the emitter-to-collector path of transistor Q3G, the winding of select magnet 205, the emitter-to-collector path of transistor Q4G, and resistor R10G to negative battery. Thus, the application of a marking signal to the keying circuit provides marking current to select magnet 205.

When the input signal to the keyer goes to a spacing condition, the base of transistor Q1G is driven to the initial negative condition causing transistors Q1G and Q2G to become back biased. When transistor Q1G turns Off the resultant positive collector potential of transistor Q1G is applied to transistor Q4G, turning Off the latter transistor. When transistor Q4G turns Off, the positive potential on the base of transistor Q3G is restored and transistor Q3G is again rendered nonconductive. Thus, the application of a spacing signal to the keyer circuit removes the marking current applied through the winding of select magnet 205.

*Timer*

The timer circuit contains transistor stages Q5E, Q4E, Q3E, Q2E and Q1E, FIG. 3. The timer performs several different functions depending upon the mode of operation of the data set. If the data set is in the answer mode of operation, immediately after the answering station has gone off-hook the timing circuit will time for a period of about one second. During this interval, indicated hereinafter as a guard interval, the terminating or answering station does not transmit any signal toward the originating station. Following the guard interval, the timer is switched to monitor for continuous marking frequency at the output of the transistor stage Q2A in the discriminator and will time-out after approximately one second of such marking signal. Once the marking signal time-out has occurred the input of the timing circuit is transferred to a subsequent stage in the discriminator. The timer then monitors for the reception of a spacing signal one second or more in duration. When the timer detects the one second spacing signal it will time-out and initiate the disconnect sequence as described hereinafter.

If the station is an originating station, the timing circuit will not time for the guard interval. The timer will first look for a marking signal from the terminating station and time-out after approximately one second of such marking signal. The timer will then transfer to a monitor space condition waiting to detect a long spacing signal calling for a disconnect.

At the originating station when the timing circut is monitoring for the reception of the marking signal, the output of transistor Q2A in the discriminator is connected through Zener diode CR12A, the break contacts of contacts CY1B, leads 401 and 402, and resistor R19E to the base of transistor Q5E as previously described. The reception of a spacing signal causes transistor Q2A to conduct connecting ground at the emitter through to the collector and over the path traced above to the base of transistor Q5E and then through resistor R18E to positive battery so that the base voltage of transistor Q5E is rendered positive. The emitter of transistor Q5E is biased slightly positive relative to ground by the voltage divider comprising resistors R16E and R17E. Thus, transistor Q5E is rendered nonconductive during the reception of a spacing signal or, due to the space-hold detector circuit, in the absence of a received signal.

With transistor Q5E Off a negative potential is applied to the base of transistor Q4E by way of resistor R15E whereby the positive potential on the emitter of transistor Q4E applied by way of resistor R13E makes transistor Q4E conductive. With transistor Q4E conductive, the emitter-to-collector current is applied by way of resistor R14E to negative battery rendering the emitter potential negative. This negative potential is applied via resistor R11E and diode CR2E to the upper plate of timing capacitor C3E as shown in FIG. 3.

In the originating station, relay AN is released whereby timing capacitor C3E is connected to the base of transistor Q3E through break contacts AN–5 and the break contacts of contacts S–7. The emitter of transistor Q3E, it is noted, is connected to ground by way of diode CR1E. The lower terminal of capacitor C3E is connected through resistor R8E and break contacts CON–7 to ground. Accordingly, as long as transistor Q5E is Off, a negative voltage is maintained across capacitor C3E and the base of transistor Q3E is held negative with respect to its emitter, maintaining transistor Q3E nonconductive.

When a marking signal is received from the terminating station, under this situation, transistor Q2A in the discriminator turns Off thereby applying negative battery through resistor R15A, Zener diode CR12A, the break contacts of contacts CY–1, leads 401 and 402, and resistor R19E to the base of transistor Q5E as previously described. This negative-going signal will cause transistor Q5E to conduct.

When transistor Q5E conducts, the potential at the collector will be driven positive. This causes the base of transistor Q4E to go positive and the voltage on the emitter of transistor Q4E will follow that of the base causing diode CR2E to cease conducting since its left-hand terminal, as shown in FIG. 3, is at the negative potential of the upper plate of capacitor C3E. When diode CR2E ceases to conduct, a charging path is established for capacitor C3E toward positive battery through resistor R10E and through resistor R7E by way of the break contacts of contacts S–7 and break contacts AN–5. Capacitor C3E will charge slowly until the base of transistor Q3E goes slightly positive rendering the transistor conductive. In the event that a spacing signal is received while capacitor C3E is charging toward positive battery, transistor Q5E is again turned Off, the emitter of transistor Q4E is again rendered negative via resistor R15E, and the negative charge is reapplied to capacitor C3E by way of diode CR2E.

Assuming now that the received marking signal is maintained until capacitor C3E goes slightly positive, and transistor Q3E conducts, the voltage at the collector will drop toward ground. The collector of transistor Q3E is connected to the base of transistor Q2E by way of resistor R5E which forms a voltage divider with resistor R4E between the collector of transistor Q3E and negative battery. Accordingly, the negative-going potential change of the collector of transistor Q3E renders the base of transistor Q2E negative in potential. Since the emitter of transistor Q2E is biased to a potential just above ground by the voltage divider comprising resistors R1E and R2E, transistor Q2E conducts when its base voltage is rendered negative and will operate as an emitter follower. Since the base of transistor Q1E is connected to the emitter of transistor Q2E and the emitter of transistor Q1E is normally grounded through the break contacts of test key contacts 305, transistor Q1E will conduct when the base voltage of transistor Q2E is rendered negative and the emitter of transistor Q2E, following its base voltage, drives the base of transistor Q1E negative.

At the originating station, relay OR is operated as described hereinafter. The collector of transistor Q1E is thus connected through lead 306, the make contacts of contacts OR–8, FIG. 4, break contacts S–1, the break contacts of contacts CON–6, and the winding of relay CON to negative battery. Thus, at an originating station, the reception of a continuous mark of about one second will turn on transistor Q1E and the resultant emitter-to-collector current of transistor Q1E operates relay CON.

The operation of relay CON does two things which effect the timer. The detailed function resulting from the operation of the relay CON will be described hereinafter. Relay CON operated operates relay CY shifting the timer input from the collector of transistor Q2A to the collector of transistor Q3A as previously described. Because of the signal inversion in going through the additional transistor stage Q3A, a negative-going signal at the collector of transistor Q3A now corresponds logically to a spacing signal rather than a marking signal. Therefore, when connected to the output of transistor stage Q3A, the timer will monitor for spacing signals and will be reset by the reception of marking signals.

As mentioned above, the operation of relay CON operates relay CY. Make contacts CY–5 in conjunction with the make contacts of contacts CON–1 connect timer capacitor C1E into the timing circuit. The previous timing capacitor C3E is disconnected by break contacts CON–7. Spacing signals will then be monitored by the timer and any spacing signals which occur will turn On transistor Q5E whereby capacitor C1E charges toward positive voltage by way of the make contacts of contacts CON–1 and resistor R7E, make contacts CY–5 or the break contacts of contacts S–7 in shunt thereto, break contacts AN–5 and resistor R10E. The time constant in this case is adjusted so that a continuous spacing signal of about one second will result in biasing the base of transistor Q3E positive causing transistor Q3E to conduct. This will turn on transistors Q2E and Q1E. The collector output of transistor Q1E is now connected through lead 306, the make contacts of contacts OR–8, and the make contacts of contacts CY–3 to the winding of relay S. Accordingly, relay S operates indicating that a spacing signal of one second or more has been received. This initiates the disconnect sequence which will be described more fully below.

The sequential circuit action of the timer at the originating station is substantially the same as the sequence at a terminating station except that there is an additional timing interval of about one second which is introduced prior to the transmission of the marking frequency $F_{2M}$ toward the originating station. This extra interval is a period of no signal transmission to the line and is called the guard interval. It is necessary to hold the application of signals to prevent interference with the propagation of the off-hook signal which originates certain operations at the central office.

The terminating mode as distinguished by the operation of relay AN is described hereinafter. The operation of relay AN opens break contacts AN–5 interrupting the previously described monitoring mark connection between the base of transistor Q3E and timing capacitor C3E. In addition, relay AN operated closes the make contacts of contacts AN–6 connecting the base of transistor Q3E to the guard timing capacitor C2E by way of the break contacts of contacts S–7, the break contacts of contacts M–4, and make contacts of contacts AN–6. Prior to the operation of relay AN, timing capacitor C2E charges to negative battery through resistor R5 and the break contacts of contacts AN–6. After relay AN operates, this negative charge is applied to the base of transistor Q3E maintaining the transistor nonconductive. Capacitor C2E, however, now charges toward positive battery through the make contacts of contacts AN–6, the break contacts of contacts M–4, the break contacts of contacts S–7, and resistor R7E until the base of transistor Q3E becomes positive. The time constant of capacitor C2E and resistor R7E is such that this will occur in about one second after relay AN operates. When transistor Q3E conducts, transistor stages Q3E and Q1E turn On connecting ground on the emitter of transistor Q1E through the emitter-to-collector path of the transistor and then through lead 306, the break contacts of contacts OR–8, make contacts AN–9 and the break contacts of contacts M–5 to the winding of relay M. Operation of relay M turns on the oscillator in the modulator as previously described causing the marking frequency $F_{2M}$ to be transmitted to the originating station. The opening of the break contacts of contacts M–4 disconnects the base of transistor Q3E from the guard timing capacitor C2E and the closure of the make contacts of contacts M–4 connects the base of transistor Q3E to timing capacitor C3E.

Conditions now are the same as in an originating station wherein the timer circuit is monitoring for the reception of a continuous marking signal. The timer will proceed to operate relay CON at the expiration of the one second marking interval and the further operation of the timing circuit is identical with the operation previously described for the originating station.

*Answer-Back Timing Circuit*

At an unattended station arranged for automatic answering, an additional timing circuit is provided by transistor stages Q1F and Q2F, FIG. 2. This timing circuit disconnects the station from the loop if the station fails to get a marking signal from the originating station within a predetermined interval of time after the terminating station concludes the guard interval by sending $F_{2M}$. This condition would occur if a telephone subscriber dialed a data station by mistake.

The base of transistor Q2F is supplied positive battery through resistor R6F and break contacts M–3. The emitter of transistor Q2F is connected to the junction of resistors R1F and R3F which resistors are connected across positive battery and ground. This renders the base of transistor Q2F positive relative to the potential at the emitter and transistor Q2F is normally nonconductive. With transistor Q2F nonconductive, the emitter of transistor Q2F connected to the base of transistor Q1F, and the emitter of transistor Q1F connected to ground, transistor Q1F is turned Off.

When a call is answered by an unattended station, the timer circuit generates the guard interval as previously described. At the end of this interval, relay M operates opening break contacts M–3 and disconnecting positive battery from the base of transistor Q2F and from capacitor C1F, which is connected to the base of transistor Q2F. Capacitor C1F thus begins to charge slowly toward negative battery through resistor R4F.

If the call is from another data set, a marking signal is received from the originating station causing the operation of relay CON as previously described. The consequent closure of make contacts CON–4 reapplies positive battery to the base of transistor Q2F and to capacitor C1F. Accordingly, the timing circuit will be recycled before it times out.

In the event that the call is from a telephone subscriber the marking signal is not received and capacitor C1F continues to charge toward negative battery until the potential on the base of transistor Q2F is rendered negative. The application of the negative potential to the base of transistor Q2F turns the transistor On driving its emitter potential negative. The application of the negative emitter potential of transistor Q2F to the base of transistor Q1F turns this latter transistor On. A current path is then available to operate relay S from ground to the emitter of transistor Q1F through the emitter-to-collector path of transistor Q1F, lead 207, and the break contacts of contacts S–6 to the winding of relay S. The operation of relay S at this time causes the release of relay AN as described hereinafter, restoring the station to the on-hook condition.

*Answer-Back Generator*

For those stations that are arranged for automatic answering, an answer-back generator is provided to inform the originating station that the terminating station has answered and is ready to receive a message. This answer-back generator is arranged when activated to cause the transmission of the teletypewriter character "V."

The answer-back generator consists of a one-shot multivibrator. Transistors Q10F and Q11F, FIG. 2, are the active elements of this circuit. The base of transistor Q11F is connected to negative battery via resistor R11F and is therefore normally conducting. The base of transistor Q10F is connected to the junction of resistors R13F and R15F which resistors are connected in series between positive battery and the collector of transistor Q11F. This applies a positive potential to the base of transistor Q10F whereby the transistor is normally Off. The input circuit includes negative battery connected through resistor R5F, make contacts M–11, make contacts CON–11, and resistor R14F which is connected to the lower plate of capacitor C11F as shown in FIG. 2. The upper plate of capacitor C11F is connected to the base of transistor Q10F.

Transistor Q10F is caused to conduct by a negative-going pulse through capacitor C11F. Such a pulse is generated in a terminating station when relay CON operates at the termination of the connect sequence. Since, as previously described, relay M operates at the terminating station during the connect sequence, the operation of relay CON provides a negative transition to the lower plate of capacitor C11F by way of make contacts CON–11.

The application of the negative-going voltage transition to capacitor C11F provides a negative pulse to the base of transistor Q10F turning the transistor On. The resultant positive-going change in the collector voltage of transistor Q10F is applied through capacitor C10F to the base of transistor Q11F turning the latter transistor Off. Transistor Q11F remains cut off until capacitor C10F charges up again toward negative battery via resistor R11F thereby reapplying a negative potential to the base of transistor Q11F. At this time, transistor Q11F will go On again and the resultant positive-going change in its collector voltage is applied through capacitor C13F to the base of transistor Q10F turning this transistor Off.

The output of the generator is taken from lead 208 which is connected to the collector of transistor Q10F. During the normal condition when transistor Q10F is Off, negative voltage is applied to lead 208 by way of resistor R10F. This voltage is blocked by diode CR10F, FIG. 1, which is connected to the base input of the break timer transistor Q4B via capacitor C6B. It may be recalled that break timer transistor Q4B is normally driven by sending contacts 203 and in turn feeds keyer transistor stage Q3B.

When transistor Q10F turns On, a positive-going potential is provided at its collector. This positive-going transition is transmitted through lead 208, diode CR10F, and capacitor C6B to the base of break timer transistor Q4B, turning it Off, and thereby causing a spacing signal to be transmitted to the line. When the monostable flip-flop circuit comprising transistors Q10F and Q11F relaxes to its normal condition, the negative voltage condition of lead 208 is restored, thus back biasing diode CR10F. The reapplication of negative battery to capacitor C6B by way of resistors R13B and R11B restores transistor Q4B to the marking condition as previously described. Accordingly, a spacing signal is transmitted having a duration equal to the interval that the monostable multivibator is in the unstable state. The duration of this interval is arranged to provide a signal simulating the teletypewriter character "V."

*Originating a Call*

When it is desired to originate a call, the originate key is depressed closing the normally open contacts 404 of the originate key, FIG. 4. Operation of this key causes the operation of relay OR over a path through the break contacts of contacts S–3, the break contacts of contacts AN–3, the originate key contacts 404, the winding of relay OR, and the break contacts of contacts S–9 to negative battery. Relay OR locks up through the make contacts of contacts OR–2 and the break contacts of contacts AN–4 to ground and removes blinding ground applied by way of the break contacts of contacts AN–4, the break contacts of contacts OR–2, and lead 416 to the base of transistor Q1A of the discriminator.

Operation of relay OR places the data set off-hook by connecting a direct current path from the tip to the ring terminal of the telephone line via the make contacts of contacts OR–12, dial pulse contact 107, filter 106, terminal 4 to terminal 8 of hybrid coil T1C, terminal 1 to terminal 3 of hybrid coil T2C, and terminal 9 to terminal 1 of hybrid coil T1C. In addition, relay OR operated lights originate lamp 405, FIG. 4 over a path from ground through the break contacts of contacts S–3, the make contacts of contacts OR–3, the filament of lamp 405 and resistor R–6 to positive battery and opens a possible operating path for relay AN by way of break contacts of contacts OR–3. Operation of relay OR switches the $F_1$ filter 101 into the sending branch by way of make contacts of contacts OR–7, switches the $F_2$ filter into the receiving branch by way of make contacts of contacts OR–1 and contacts OR–4, and inserts pad 103 in the transmitting branch by way of the make contacts of contacts OR–11 as previously described. By opening the break contacts of contacts OR–9, FIG. 4, relay OR removes a negative disabling clamp provided by way of resistor R–2, the break contacts of contacts AN–10, the break contacts of contacts OR–9, lead 307, and resistor R9E, FIG. 3, to the junction of diode CR2E and capacitor C3E to permit the timer to monitor for a marking signal received from the telephone line. By closing the make contacts of contacts OR–9, a negative marking signal is applied to the base of transistor Q3A blinding the transistor to signals. This function is only utilized upon disconnecting the stations, however, as described hereinafter. Also, the operation of relay OR opens the previously described disabling path for the space-hold detector from ground through the break contacts of contacts AN–7, the break contacts of contacts OR–10, and lead 304. Finally, relay OR operated connects the output of the timer applied to lead 306 to the winding of relay CON by way of the make contacts of contacts OR–8, the break contacts of contacts S–1, and the break contacts of contacts CON–6.

After the operation of relay OR, the off-hook signal into the central telephone office results in dial tone applied across the telephone line. This dial tone, as previously described, is applied across terminals 6 and 8 of hybrid coil T2C and then by way of lead 109 to transistor amplifier Q1D which, in turn, supplies the dial tone by way of lead 301 to listen-only hand set 109. The data set attendant, hearing the dial tone, now dials, momentarily opening dial pulse contacts 107 thereby opening and closing the previously described tip and ring connection.

In response to the dial pulses the calling party is connected through the telephone network and ringing signal is transmitted to the called station in the conventional manner. The calling attendant will hear the audible ringing tone in listen-only hand set 109. If some difficulty is encountered in setting up the connection, the attendant hears the conventional supervisory tones a normal telephone subscriber would hear. As described hereinafter, the terminating station, in response to the call, provides an initial guard interval followed by the transmission of the $F_{2M}$ marking signal.

The originating station receives the $F_{2M}$ marking signal from the terminating station and this frequency is detected by the discriminator whereupon the timer proceeds to monitor the discriminator output for a one second mark by way of the break contacts of contacts CY–1 and leads 401 and 402, as previously described. At the expiration of the one second marking interval, transistor Q1E conducts, as previously described, whereby current is provided from ground by way of test key contacts 305, the emitter-to-collector path of transistor Q1E, lead 306, the make contacts of contacts OR–8, the break contacts of contacts S–1, and the break contacts of contacts CON–6 to the winding of relay CON. Relay CON locks to ground by way of the make contacts of contacts CON–6, the make contacts of contacts OR–10, and the break contacts of contacts AN–7.

Relay CON operated extends ground by way of make contacts CON–9, FIG. 1, to capacitor C1D, thereby short-circuiting the received tones previously applied to listen-only hand set 109. The closure of make contacts CON–12 extends negative battery to the collector of oscillator transistor Q2B, as previously described, thereby turning On the oscillator. Since relay AN is released and send contacts 202 are closed, the oscillator transmits frequency $F_{1M}$.

Relay CON operated also completes an operating path for relay CY by way of make contacts CON–5, and break contacts S–5. In addition, relay CON operated disconnects negative battery from timing capacitor C1E by way of the break contacts of contacts CON–1 and connects capacitor C1E to the base of transistor Q3E by way of the make contacts of contacts CON–1, preparing the timer to monitor for a one second spacing signal as previously described. Finally, relay CON operated extends ground by way of make contacts CON–3 to the space-hold detector capacitor C13D, enabling the capacitor, as previously described.

Relay CY operated transfers the collector output of transistor Q2A from the timer input by way of the break contacts of contacts CY–1 to the base of transistor Q3A by way of the make contacts of contacts CY–1. With relay CON operated, the input of the timer is now connected to the collector of transistor Q3A by way of lead 402 and the make contacts of contacts CON–2, as previously described. The operation of relay CY removes the previously described negative marking clamp applied to the base of transistor Q3A by way of the break contacts of contacts CY–2. Relay CY operated prepares an operating path for relay S which extends from the timer output lead 306 by way of the make contacts of contacts OR–8 and the make contacts of contacts CY–3 to the winding of relay S. Finally, the operation of relay CY completes an obvious operating path for relay MST, FIG. 2, by way of make contacts CY–4. Relay MST is the motor start relay and, when operated, functions to turn on the motor of teletypewriter 201 in the conventional manner.

The teletypewriter at the originating station is now ready for communication with the terminating station subject to bringing the teletypewriter motor up to normal speed. Communication will start when the terminating station responds by indicating that it is ready to receive a message. Since this occurs after a one second interval, as described hereinafter, the attendant at the originating station proceeds to communicate with the terminating station upon receiving the answer-back signal.

*Receiving a Call*

At the terminating station ringing current is applied over a path from the tip connection of the telephone line through the break contacts of contacts OR–12, the break contacts of contacts AN–12, ringer 115, and capacitor C5B to the ring line connection. A portion of the ringing current will also flow into a path in parallel with ringer 115 through capacitor C3C, thermistor RT1C, the winding of relay RU, in parallel with diode CR1C to the ring side of the line. The initial high resistance of thermistor RT1C prevents immediate operation of relay RU in order to avoid its operation on line surges. The ringing current heats thermistor RT1C gradually decreasing its resistance, until relay RU operates. As long as the ringing persists relay RU operates during each ringing interval and releases during each silent interval. Diode CR1C acts as a half-way rectifier to provide pulsating direct current to operate relay RU. Varistor RV1C, in shunt to thermistor RT1C and diode CR1C, protects the thermistor and diode from high voltage transients.

Assuming the terminating station is attended, the attendant thereat will answer the call by operating the answer key to close answer key contacts 406. This completes a path from ground by way of the break contacts of contacts S–3, the break contacts of contacts OR–3, answer key contacts 406, the winding of relay AN, and the break contacts of contacts S–9 to negative battery, operating relay AN, which locks by way of the make contacts of contacts AN–4. In the event that the station is unattended, lead 408 is strapped to the winding of relay AN whereby the operation of relay RU provides ground by way of break contacts CY–7 and make contacts RU–11 operating relay AN.

Relay AN operated removes the previously described disabling ground applied to transistor Q1A by way of the break contacts of contacts AN–4. The operation of relay AN provides ground to answer lamp 407 by way of the break contacts of contacts S–3 and the make contacts of contacts AN–3. It is noted that ground is also supplied to answer lamp 407 by way of make contacts RU–8. The closure of the make contacts of contacts AN–12 completes the connection from the tip to the ring of the telephone line by way of the break contacts of contacts OR—12 and the make contacts of contact AN–12 whereby the station goes off-hook. Relay AN operated removes the previously described negative disabling voltage applied to timer capacitor C3E by way of the break contacts of contacts AN–10 and provides a negative marking battery to the base of transistor Q3A by way of the make contacts of contacts AN–10. The operation of relay AN also tunes the oscillator to the $F_2$ frequency by closing the make contacts of contacts AN–1 and AN–2 and opening the break contacts of contacts AN–1 and AN–2, as previously described. In addition, relay AN removes the negative battery applied to timer capacitor C2E by way of the break contacts of contacts AN–6, disconnects timer capacitor C3E from the base of transistor Q3E by way of break contacts AN–5, and extends capacitor C2E to the base of transistor Q3E by way of the make contacts of contacts AN–6. As previously described, this arranges the timer to time the guard interval.

At the expiration of the guard interval, transistor Q1E conducts, applying ground by way of lead 306, the break contacts of contacts OR–8, the make contacts of contacts AN–9, and the break contacts of contacts M–5 to the winding of relay M which operates and locks by way of the make contacts of contacts M–5 and the make contacts of contacts AN–7. Relay M operated connects negative battery to the collector of transistor Q2B by way of make contacts M–12 whereby frequency $F_{2M}$ is transmitted to the line. Also, relay contacts M–1 and M–2 tune the discriminator to receive on the $F_1$ band as previously described. The operation of relay M reconnects capacitor C3E to the base of transistor Q3E by way of the make contacts of contacts M–4 and the break contacts of contacts S–7. The timer at this time proceeds to monitor for the reception of a marking signal from the originating station. The operation of relay M also disconnects positive battery from the base of transistor Q2F thereby starting the automatic disconnect timing circuit as previously described. Finally, relay M operated extends timer output lead 306 to the winding of relay CON by way of the break contacts of contacts OR–8, make contacts M–10, break contacts S–1 and break contacts of contacts CON–6.

With the terminating station transmitting the marking frequency $F_{2M}$, the originating station monitors the signal for the marking interval as previously described. At the conclusion of the marking interval, the originating station transmits the marking frequency $F_{1M}$ to the terminating station. Recalling that, after the operation of relay M at the terminating station, the timer is monitoring for the reception of the marking frequency, the reception of frequency $F_{1M}$ turns On transistor Q1E. This supplies current by way of lead 306 to the break contacts of contacts OR–8, make contacts M–10, break contacts S–1 and the break contacts of contacts CON–6 to the winding of relay CON, operating the relay which locks by way of the make contacts of contacts CON–6 and the make contacts of contacts AN–7.

In the event, however, that a telephone subscriber has dialed the station in error, frequency $F_{1M}$ is not received and relay CON does not operate. Accordingly, automatic disconnect transistor Q2F is turned On, as previously described, operating relay S. Relay S operated opens the previously described energizing path for the relay AN by way of the break contacts of contacts S–9 and extends the path by way of the make contacts of contacts S–9, the break contacts of contacts CY–3, make contacts M–10 and lead 306 to the collector of transistor Q1E. Relay S operated also opens the previously described path connecting timing capacitor C3E to the base of transistor Q3E via the break contacts of contacts S–7. Accordingly, positive battery is applied to the base of transistor Q3E through resistor R7E. Transistor Q3E turns On, turning On, in turn, transistors Q2E and Q1E. The resultant ground at the emitter of transistor Q1E is therefore applied by way of its collector to the winding of relay AN shunting the winding. The release of relay AN opens the previously described locking paths of relays M and S restoring the set to the initial quiescent condition.

Returning now to the operation of a relay CON, this prepares timer capacitor C1E to monitor for a one second spacing signal, connects the output of transistor Q3A to the timer input, enables space-hold detector capacitor C13D, completes the operating path for relay CY, disables timer capacitor C3E and completes a supplementary current path for the collector of oscillator transistor Q2B in substantially the same manner as previously described for the originating station. In addition, relay CON operated reapplies battery to the base of transistor Q2F in the answer-back disconnect circuit by way of resistor R6F and make contacts CON–4, disabling the circuit. Finally, relay CON operated completes the previously described negative pulsing path for the answer-back circuit by way of resistor R5F, make contacts M–11 and CON–11, resistor R14F, and capacitor C11F to the base of transistor Q10F in the answer-back generator circuit. In the event that the station is unattended, lead 208 is strapped to diode CR10F whereby the teletypewriter character "V" is transmitted back to the originating station in response to the application of the negative pulse to the base of transistor Q10F as previously described.

Relay CY operated transfers the output of transistor Q2A from the timer input to the base of transistor Q3A, removes the negative blinding signal applied to the base of transistor Q3A, and completes the operating path for relay MST starting the teletypewriter motor, in substantially the same manner as previously described for relay CY in the originating station.

The two teletypewriters are now ready for communication over the two frequency shift channels $F_1$ and $F_2$. Messages may now be transmitted in either direction until the communication interval is terminated by the disconnect and clearing sequence.

*Disconnect and Clearing Sequence*

The disconnect and clearing sequence is initiated when communication is completed between the two stations. The sequence may be started at either station by operating the nonlocking clear key which includes normally open contacts 410, FIG. 4.

Assuming that the originating station operates the clear key, a path from ground is completed through the break contacts of contacts AN–7, the make contacts of contacts OR–10, contacts 410 of the clear key, and the winding of relay S to battery, operating relay S which locks by way of the make contacts of contacts S–6, the make contacts of contacts OR–10, and the break contacts of contacts AN–7. The operation of relay S turns off originating lamp 405 by opening the break contacts of contacts S–3, and lights clear lamp 411 by extending ground to the lamp by way of the make contacts of contacts S–3. Relay S operated opens the previously described operating path for relay CY by way of break contacts S–5, releasing relay CY. Relay S operated also opens the path extending from the collector of the break transistor Q4B to the base of transistor switch Q3B by way of the break contacts of contacts S–8. This results in the application of positive battery to the base of transistor Q3B by way of resistor R16B, turning Off the transistor whereby the spacing frequency $F_{1S}$ is transmitted as previously described. This spacing frequency is used to disconnect the terminating station as described hereinafter. In addition, relay S operated extends negative battery by way of resistor R4, FIG. 3, the make contacts of contacts S–7, and make contacts CY–5 to the base of transistor Q3E in the timer circuit, applying negative battery to the base of transistor Q3E during the momentary interval when relay S and relay CY are both operating. The application of the negative battery to the base of transistor Q3E turns the transistor Off thereby turning Off, in turn, transistors Q3E and Q1E as previously described and discharges capacitor C1E.

When relay CY releases, the negative voltage applied to the base of transistor Q3E by way of make contacts CY–5 is removed, and capacitor C1E charges toward positive battery by way of the make contacts of contacts CON–1 and resistor R7E. After about one second, the voltage on the base of transistor Q3E goes slightly positive, turning On the transistor which thereby turns On, in turn, transistors Q2E and Q1E. With transistor Q1E conducting, current is applied by way of the collector-to-emitter path of transistor Q1E, lead 306, the make contacts of contacts OR–8, the break contacts of contacts CY–3, and the make contacts of contacts S–9 to the winding of relay OR. This ground connection to the winding of relay OR short-circuits the relay and it releases. The release of relay CY also opens the previously described operating path for relay MST and the teletypewriter motor is thereby turned Off. In addition, the release of relay CY provides a negative marking signal to the base of transistor Q3A by way of negative battery, resistor R2, the break contacts of contacts AN–10, the make contacts of contacts OR–9, the break contacts of contacts CY–2 and resistor R14A. The negative battery holds transistor Q3A conductive, whereby a marking signal is applied to the keyer circuit by way of lead 403. Thus the teletypewriter selector magnet is maintained in the marking condition while the teletypewriter motor is slowing down to a stop, thereby preventing false characters from being stored in the teletypewriter.

As previously described, relay OR releases at the termination of the one second interval. The release of relay OR removes the application of negative battery to capacitor C2 by way of resistor R2, the break contacts of contacts AN–10 and the make contacts of contacts OR–9. The potential of capacitor C2 is now charged from positive battery by way of resistors R12A, R13A and R14A, and the break contacts of contacts CY–2. Accordingly, transistor Q3A is maintained in the marking conductive condition until the potential to the base has risen sufficiently, due to the charging of capacitor C2, to turn transistor Q3A. Off. This marking interval is maintained for a sufficient duration of time to prevent the printing of any false characters when the teletypewriter motor is turned on. Relay OR released also opens the previously described locking paths for relays CON and S by way of the make contacts of contacts OR–10, whereby relays CON and S release. In addition, relay OR released places the originating station in the on-hook condition by opening the make contacts of contacts OR–12. Relay S released opens the previously described energizing path for clear lamp 411, extinguishing the lamp. Relay CON released opens the previously described collector current path for oscillator transistor Q2B by way of make contacts CON–12 whereby transistor Q2B is turned Off.

The termination of the disconnect and clearing sequence at the originating station has now resulted in the release of relays OR, S, and CON, as previously described above. This restores the originating station circuit to the initial condition.

As previously described, spacing frequency $F_{1S}$ is sent by the originating station during its clearing sequence to the terminating station. This prolonged spacing condition is detected at the terminating station by the discriminator, and applied by the collector of transistor Q3A to the base of timer transistor Q5E by way of lead 402, as previously described. The resultant application of the spacing condition places negative battery on lead 402 whereby transistor Q5E turns On, applying a positive potential on the emitter of transistor Q4E whereby diode CR2E is back biased. As previously described, capacitor C1E proceeds to charge toward positive battery thereby turning On transistor Q3E after an interval of approximately one second. When transistor Q3E becomes conductive, transistor Q2E and transistor Q1E, in turn, become conductive. The resultant collector-to-emitter current through transistor Q1E is applied by way of lead 306, the break contacts of contacts OR–8, the make contacts of contacts M–10, the make contacts of contacts CY–3 and the winding of relay S to battery, operating relay S which locks by way of the make contacts of contacts S–6 and the make contacts of contacts AN–7. Once relay S has operated at the terminating station, the action is essentially identical to that previously described at the originating station following the operation of relay S thereat, with the exception that the subsequent operation of the timer circuit applies the shunting ground to the winding of relay AN and relay OR in parallel thereto whereby relay AN is released at the terminating station. In addition, the release of relay AN opens the previously described locking path for relay M releasing this latter relay.

In the event that the terminating station initiates the disconnect sequence, the operation of the clear key completes a path from ground by way of the make contacts of contacts AN–7, contacts 410 of the clear key, and the winding of relay S to battery. The operation of relay S now completes the disconnect and clearing sequence at the terminating station in the same manner as previously described. It is noted, however, that the terminating station, when cleared, sends the spacing frequency $F_{2S}$ toward the originating station when the collector of transistor Q4B is disconnected from the base of transistor Q3B by way of the break contacts of contacts S–8. This spacing frequency is detected at the originating station, operating the timer circuit after an interval of approximately one second, whereby ground is applied by way of lead 306, the make contacts of contacts OR–8 and the make contacts of contacts CY–3 to the winding of relay S. The consequent operation of relay S provides the disconnect and clearing sequence at the originating station in the same manner as previously described.

*Transmission Failure Disconnect*

Interruption of the transmission of signals due to a transmission failure initiates the previously described disconnect and clearing sequence. Since, as previously described, the interruption of signals activates the space-hold detector, a continuous spacing condition is applied to the timer circuit. Consequently, after one second, a clearing and disconnect sequence will be initiated at the station which fails to receive signals. During this clearing sequence, the disconnecting station sends spacing frequency to the other station, as previously described. Both the stations thus disconnect in the same manner as previously described for the station which disconnects in response to the reception of the spacing frequency transmitted from the remote station during the disconnect sequence. Accordingly, a one-way transmission failure in either direction results in disconnection of both stations.

*Local Operating Mode*

Operation of the locking local key connects the teletypewriter keyboard through a local circuit to the teletypewriter select magnet enabling the attendant to practice. Make contacts 412 of the local key light local lamp 413 when the local key is operated. In addition, the operation of the local key closes make contacts 414, completing a path from ground by way of contacts 414 and break contacts S–5 to the winding of relay CY. The operation of relay CY, in turn, completes the operating path of relay MST, as previously described, whereby the teletypewriter motor is started. Sending contacts 202 and break contacts 203 of teletypewriter 201 transmit signals through break timer stage Q4B, as previously described. The signals at the collector of transistor Q4B are, in turn, applied by way of lead 114 and resistor R13A to diode CR14A. It is recalled that diode CR14A forms one of the three OR gate diodes feeding transistor stage Q2A in the discriminator. Accordingly, signals originating from the keyboard of teletypewriter 201 are fed by way of diode CR14A to the base of transistor Q2A.

It is necessary to hold diodes CR9A and CR11A nonconducting in order that there is no interference with the teletypewriter keyboard signals. Diode CR11A is connected to the space-hold detector circuit, as previously described. When relays AN and OR are released, ground is applied by way of the break contacts of contacts AN–7, the break contacts of contacts OR–10, and lead 304 to the junction of resistors R15D and R25D in the space-hold detector circuit, thereby shunting the space-hold negative bias voltage supply. Accordingly, this shunt is effected in the local mode in order to render diode CR11A nonconducting.

Diode CR9A is connected to the emitter of transistor Q1A. The base of transistor Q1A is fed by the output of the discriminator and is connected to the junction of inductor L1A and capacitor C7A. When relays AN and OR are released, shunting ground is applied by way of the break contacts of contacts AN–4, the break contacts of contacts OR–2, and lead 416 to the base of transistor Q1A, maintaining the emitter of transistor Q1A at about ground potential. With the emitter of transistor Q1A at ground, and diode CR9A connected by way of resistors R9A, R6A and R10A to positive battery, diode CR9A is reversely biased and, therefore, nonconducting.

The signals provided to the base of transistor Q2A by way of diode CR14A appear at the collector of transistor Q2A and are then applied by way of transistor Q3A, lead 403, and the keyer circuit to select magnet 205 of teletypewriter 201, as previously described. Thus, signals transmitted through send contacts 202 are applied to select magnet 205. At the conclusion of the practice period, the station is restored to normal by operating the clear key which mechanically releases the locked local key. The local key released opens the operating path for relay CY, whereby relay MST is released and the station is restored to the initial condition.

It is noted that the data set accepts incoming calls while in the local mode if the attendant operates the answer key when ringer 115 is activated.

*Test Operating Mode*

The test mode is provided to enable certain performance tests to be made by a remote test center. These tests are performed by looping the demodulator output signals through transistor stages Q5E and Q4E of the timer circuit to the input of the frequency shift oscillator. Assuming that the station has originated a call to the test center and has been connected in the normal manner, relays OR, CON and CY are operated. The attendant operates the test key in the data set completing an obvious energizing path for test lamp 111 by way of make contacts 110 of the test key. Make contacts 110 also provide ground by way of diode CR1B to the emitter of transistor Q4B, thereby permitting signals originating from the teletypewriter keyboard to be applied by way of lead 114 to diode CR14A. As previously described, the signals applied to diode CR14A are passed through transistor Q2A and transistor Q3A to the collector of transistor Q3A. With relay CON operated, the output of transistor Q3A is applied by way of lead 402 to the base of transistor Q5E in the timer. The signals are thus transmitted by way of transistors Q5E and Q4E to the junction of resistors R11E and R13E connected to the emitter of transistor Q4E. These signals are then applied by way of resistor R12E, lead 309, the make contacts of test key contacts 106, and the break contacts of contacts S–8 to the base of transistor Q3B. Accordingly, with the test key operated, signals received from the test center are applied by way of the limiter and the discriminator to transistors Q5E and Q4E in the timer, and by way of lead 309 to the oscillator, whereby the signals are retransmitted back to the test center. In addition, with the test center transmitting continuous marking signals, signals may be transmitted from send contacts 202 to the remote test center by way of transistor Q4B, lead 114, transistors Q2A and Q3A, lead 402, transistors Q5E and Q4E, lead 309, and the frequency shift oscillator. It is noted that the output of transistor Q3A also applies the signals to select magnet 205 by way of the keyer circuit, as previously described. Thus, a test message transmitted to the subset in the $F_2$ frequency band will be repeated in the $F_1$ frequency band back to the test center and, at the same time, the teletypewriter receiver will monitor the test message. This test message may be also received in the $F_1$ frequency band and transmitted back in the $F_2$ frequency band by placing the subset in the terminating mode.

*Interchanging Frequency Bands*

Under certain conditions it may be desirable to interchange the frequency band without disconnecting from the remote station or test center. Assuming that the subset is in the originating mode, the clear key is momentarily operated and the answer key is operated immediately thereafter and held operated until answer lamp 407 lights.

The closure of contacts 410 of the clear key operates relay S to initiate the disconnect and clearing sequence, as previously described. During the disconnect and clearing sequence, relays CY and MST release, followed by the release of relays OR, S and CON, as previously described. The release of relays OR and S with the answer key operated completes a path from ground by way of the break contacts of contacts S–3, the break contacts of contacts OR–3 and make contacts 406 of the answer key to the winding of relay AN. Accordingly, either the make contacts of contacts OR–12 or the make contacts of contacts AN–12 are closed during the switching process except for a brief transition interval of a few milliseconds so that the off-hook condition of the telephone line will be maintained at the local station. Operation of relay AN now results in placing the data set in the terminating mode in the same manner as previously described. The remote station, however, must transmit the marking frequency $F_{1M}$ to complete the sequence, placing the data set in the terminating mode. Signals may then be transmitted from the remote station or test center to the local data set in the $F_1$ frequency band and signals from the local data set are transmitted in the $F_2$ frequency band.

Although a specific embodiment of the invention has been shown and described, it will be understood that various modifications may be made without departing from the spirit of the invention and within the scope of the appended claims.

What is claimed is:

1. In a data transmission system including a two-way transmission channel capable of conveying ringing and data signals, signaling means for applying signals to said channel, receiving means responsive to data signals from said channel, inverter means responsive to said receiving means, timing means operable a predtermined interval after energization thereof, operable means responsive to the reception of ringing signals from said channel for energizing said timing means in a first instance, means responsive to said operation of said timing means in said first instance for operating said signaling means and rendering said timing means responsive to said receiving means in a second instance, and means responsive to said operation of said timing means in said second instance for rendering said timing means responsive to said inverter means in a third instance.

2. In a data transmission system including a two-way transmission channel, signaling means for applying signals to said channel, receiving means responsive to data signals from said channel, inverter means responsive to said receiving means, timing means operable a predetermined interval after energization thereof, operable means for energizing said timing means in a first instance, means responsive to said operation of said timing means in said first instance for operating said signaling means and rendering said timing means responsive to said receiving means in a second instance, means responsive to said operation of said timing means in said second instance for rendering said timing means responsive to said inverter means in a third instance, and means responsive to said operation of said timing means in said third instance for disabling said receiving means.

3. In a data transmission system including a two-way transmission channel, receiving means responsive to data signals from said channel, recording means, inverter means for applying data signals to said recording means, timing means operable a predetermined interval after energization thereof, operable means for energizing said timing means in a first instance, means responsive to said operation of said timing means in said first instance for extending the output of said receiving means to said timing means in a second instance, means responsive to said operation of said timing means in said second instance for transferring said output of said receiving means to said inverter means and extending said output of said inverter means to said timing means in a third instance, and means responsive to said operation of said timing means in said third instance for rendering said receiving means nonresponsive to signals from said channel.

4. In a data transmission system including a transmission channel capable of conveying data signals having a first or second condition, receiving means for receiving said data signals from said channel, inverter means for reversing the condition of said signals, recording means responsive to said inverter means for recording said signals, timing means operable in response to the application of said first condition signal, means for normally applying the output of said receiving means to said timing means, operable means for extending said channel to said receiving means, means responsive to the operation of said timing means for transferring said output of said receiving means to said inverter means and applying the output of said inverter means to said timing means, and means thereafter responsive to the operation of said timing means for disabling said operable means.

5. In a data transmission system including a transmission channel capable of conveying signals having a first or second condition, means operable in response to the application of said first condition signal, receiving means for applying signals received from said channel to said operable means, inverter means for reversing the condition of said signals, and means responsive to the operation of said operable means for transferring the output of said receiving means to said inverter means and applying the output of said inverter means to said timing means.

6. In a telegraph system including a transmission channel for transmitting marking and spacing telegraph signals, means connected to said channel for generating first and second condition signals in accordance with the reception of said marking and spacing signals from said channel, inverter means for reversing the condition of said first and second condition signals, means operable in response to the generation of said first condition signal by said generating means, and means responsive to the operation of said operable means for rendering said operable means responsive to said inverter means and extending the output of said generating means to said inverter means.

7. In a telegraph station including a two-way transmission channel capable of conveying telegraph signals, a normally disabled telegraph mechanism, an inverter circuit for applying telegraph signals to said mechanism, means for receiving said telegraph signals, signaling means for applying signals to said channel, operable means for extending said channel to said receiving means, timing means normally connected to the output of said receiving means, other means responsive to said timing means for transferring the output of said receiving means from said timing means to said inverter circuit and extending the output of said inverter circuit to said timing means, means responsive to said other means for enabling said telegraph mechanism, and means thereafter responsive to said timing means for operating said signaling means and releasing said operable means.

8. A data transmission system including a two-way transmission channel comprising a recorder, an inverter circuit for applying data signals to said recorder, timing means operable a predetermined interval after the application of a signal thereto, receiving means for applying data signals received from said channel to said timing means, and other means responsive to said operation of said timing means for transferring the output of said receiving means from said timing means to said inverter circuit and extending the output of said inverter circuit to said timing means.

9. In a telegraph station including a two-way transmission channel capable of conveying telegraph signals, a telegraph mechanism, an inverter circuit for applying telegraph signals to said mechanism, means for receiving said telegraph signals, signaling means for applying signals to said channel, operable means for extending said channel to said receiving means, timing means normally connected to the output of said receiving means, means responsive to said timing means for operating said signaling means, other means responsive to said timing means for transferring the output of said receiving means from said timing means to said inverter circuit and extending the output of said inverter circuit to said timing means, and means thereafter responsve to said timing means for releasing said operable means.

10. In a telegraph station including a two-way transmission channel capable of conveying ringing and telegraph signals, a normally disabled telegraph mechanism, an inverter circuit for applying telegraph signals to said mechanism, means for receiving said telegraph signals, signaling means for applying signals to said channel, operable means responsive to the reception of said ringing signals for extending said channel to said receiving means, timing means normally connected to the output of said receiving means, other means responsive to said timing means for transferring the output of said receiving means from said timing means to said inverter circuit and extendng the output of said inverter circuit to said timing means, means responsive to said other means for enabling said telegraph mechanism, and means thereafter responsive to said timing means for operating said signaling means and releasing said operable means.

11. A telegraph station including a two-way transmission channel capable of conveying ringing and telegraph signals comprising a normally disabled telegraph mechanism, an inverter circuit for applying telegraph signals to said mechanism, signaling means for applying signals to said channel, timing means operable a predetermined interval after the application of a signal thereto operable means responsive to ringing signals on said line for enabling said timing means, receiving means responsive to said operable means for applying signals received from said channel to said timing means, other means responsive to said operation of said timing means for transferring the output of said receiving means for said timing means to said inverter circuit and extending the output of said inverter circuit to said timing means, means responsive to said other means for enabling said mechanism, and means thereafter responsive to said operation of said timing means for operating said signaling means and releasing said operable means.

12. In a data transmission system including a two-way transmission channel, first signaling means for applying a signal of a first frequency to said channel, second signaling means for applying a signal of a second frequency to said channel, first receiving means responsive to the reception of said first frequency signal from said channel, second receiving means responsive to the reception of said second frequency signal from said channel, first operable means for enabling said first receiving means and said second signaling means, second operable means for enabling said second receiving means and conditioning said first signaling means, and means enabled by said responsive second receiving means for enabling said conditioned first signaling means.

13. In a data transmission system including a two-way transmission channel, first signaling means for applying a signal of a first frequency to said channel, said signaling means for applying a signal of a second frequency to said channel, first receiving means responsive to the reception of said first frequency signal from said channel, second receiving means responsive to the reception of said second frequency signal from said channel, signal recording means, first operable means for enabling said first receiving means and said second signaling means, second operable means for enabling said second receiving means and conditioning said first signaling means, means enabled by said responsive first receiving means for rendering said signal recording means responsive to said first receiving means, and means enabled by said responsive second receiving means for enabling said conditioned first signaling means and rendering said signal recording means responsive to said second receiving means.

No references cited.